US012750576B2

(12) United States Patent
Ramisetty et al.

(10) Patent No.: US 12,750,576 B2
(45) Date of Patent: Sep. 29, 2026

(54) DETERMINING IMAGE-CAPTURE SETTINGS

(71) Applicant: QUALCOMM Incorporated, San Diego, CA (US)

(72) Inventors: Sandeep Ramisetty, Hyderabad (IN); Phani Bhushan Tholeti, Hyderabad (IN); Joshin Mathew, Kottarakkara (IN); Pradeep Veeramalla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 19/014,092

(22) Filed: Jan. 8, 2025

(65) Prior Publication Data

US 2026/0197545 A1 Jul. 9, 2026

(51) Int. Cl.

*H04N 23/55* (2023.01)
*G02B 7/02* (2021.01)
*G03B 13/36* (2021.01)
*G06F 3/01* (2006.01)
*G06V 10/25* (2022.01)

(52) U.S. Cl.

CPC ............. *H04N 23/55* (2023.01); *G02B 7/023* (2013.01); *G03B 13/36* (2013.01); *G06F 3/013* (2013.01); *G06V 10/25* (2022.01)

(58) Field of Classification Search

CPC ........ H04N 23/55; G02B 7/023; G03B 13/36; G06F 3/013; G06V 10/25

See application file for complete search history.

(56) References Cited

U.S. PATENT DOCUMENTS

2007/0156021 A1* 7/2007 Morse .................. A61B 1/0692 600/176
2019/0197995 A1* 6/2019 Ganille .............. G02B 27/0172
2019/0253607 A1* 8/2019 Chen ....................... H04N 23/62
2020/0007794 A1* 1/2020 Wu ........................... G06T 5/80
2023/0131642 A1 4/2023 Tacy et al.
2023/0154134 A1* 5/2023 Oh .......................... G06F 3/011 382/103
2023/0164423 A1 5/2023 Xu et al.
2023/0314909 A1* 10/2023 DiMeo .................. G03B 13/36 348/345
2024/0242358 A1 7/2024 Feng

* cited by examiner

*Primary Examiner* — Hung H Lam

(74) *Attorney, Agent, or Firm* — QUALCOMM Incorporated

(57) ABSTRACT

Systems and techniques are described herein for capturing image data. For instance, a method for capturing image data is provided. The method may include: determining a first lens position for a camera; adjusting a lens of the camera to the first lens position; receiving first image data from the camera, wherein the first image data is captured by the camera with the lens at the first lens position; determining a first region of interest (ROI) associated with the first image data; receiving inertial-measurement-unit (IMU) data; determining a second ROI based on the IMU data; determining a second lens position based on the second ROI and the first image data; adjusting the lens of the camera to the second lens position; and capturing second image data, wherein the second image data is captured by the camera with the lens at the second lens position.

20 Claims, 15 Drawing Sheets

DETERMINING IMAGE-CAPTURE SETTINGS

TECHNICAL FIELD

The present disclosure generally relates to image-capture settings of a camera. For example, aspects of the present disclosure include systems and techniques for determining image-capture settings of a camera.

BACKGROUND

A camera may focus light from a scene onto an image sensor using a lens. A position of the lens relative to the image sensor (e.g., a "lens position") may determine a depth of focus. For example, objects at a first depth may be in focus (e.g., appear sharp in an image) when the lens is at a first lens position. Additionally objects at a second depth may be out of focus (e.g., appear blurry) when the lens is at the first lens position. Similarly, objects at the first depth may be out of focus when the lens is at the second lens position and objects at the second depth may be in focus when the lens is at the second lens position.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for capturing image data. According to at least one example, a method is provided for capturing image data. The method includes: determining a first lens position for a camera; adjusting a lens of the camera to the first lens position; receiving first image data from the camera, wherein the first image data is captured by the camera with the lens at the first lens position; determining a first region of interest (ROI) associated with the first image data; receiving inertial-measurement-unit (IMU) data; determining a second ROI based on the IMU data; determining a second lens position based on the second ROI and the first image data; adjusting the lens of the camera to the second lens position; and capturing second image data, wherein the second image data is captured by the camera with the lens at the second lens position.

In another example, an apparatus for capturing image data is provided that includes at least one memory and at least one processor (e.g., configured in circuitry) coupled to the at least one memory. The at least one processor configured to: determine a first lens position for a camera; adjust a lens of the camera to the first lens position; receive first image data from the camera, wherein the first image data is captured by the camera with the lens at the first lens position; determine a first region of interest (ROI) associated with the first image data; receive inertial-measurement-unit (IMU) data; determine a second ROI based on the IMU data; determine a second lens position based on the second ROI and the first image data; adjust the lens of the camera to the second lens position; and capture second image data, wherein the second image data is captured by the camera with the lens at the second lens position.

In another example, a non-transitory computer-readable medium is provided that has stored thereon instructions that, when executed by one or more processors, cause the one or more processors to: determine a first lens position for a camera; adjust a lens of the camera to the first lens position; receive first image data from the camera, wherein the first image data is captured by the camera with the lens at the first lens position; determine a first region of interest (ROI) associated with the first image data; receive inertial-measurement-unit (IMU) data; determine a second ROI based on the IMU data; determine a second lens position based on the second ROI and the first image data; adjust the lens of the camera to the second lens position; and capture second image data, wherein the second image data is captured by the camera with the lens at the second lens position.

In another example, an apparatus for capturing image data is provided. The apparatus includes: means for determining a first lens position for a camera; means for adjusting a lens of the camera to the first lens position; means for receiving first image data from the camera, wherein the first image data is captured by the camera with the lens at the first lens position; means for determining a first region of interest (ROI) associated with the first image data; means for receiving inertial-measurement-unit (IMU) data; means for determining a second ROI based on the IMU data; means for determining a second lens position based on the second ROI and the first image data; means for adjusting the lens of the camera to the second lens position; and means for capturing second image data, wherein the second image data is captured by the camera with the lens at the second lens position.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
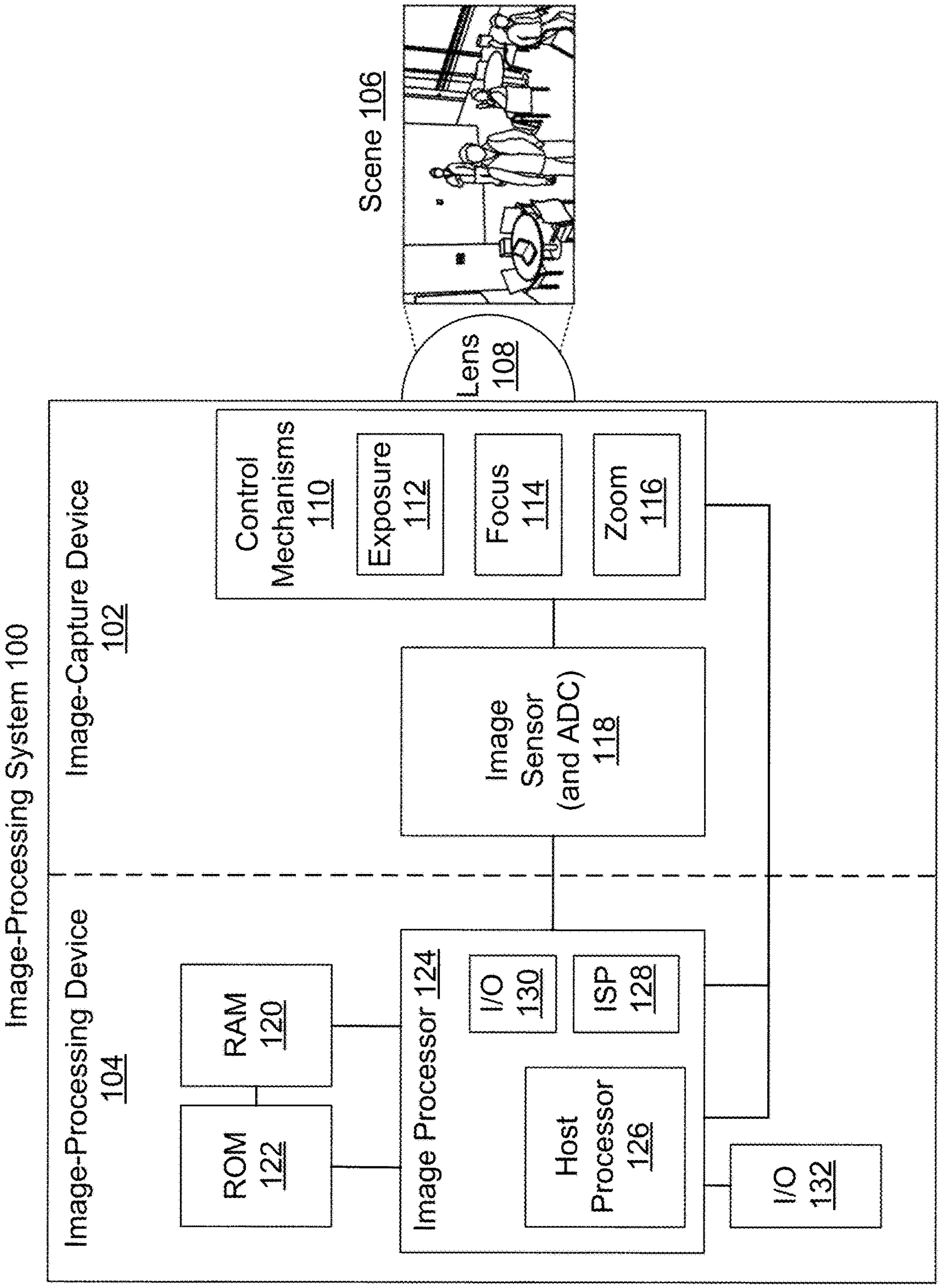
FIG. 1 is a block diagram illustrating an example architecture of an image processing system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with cameras to capture image frames, such as still images and/or video frames, for consumption. For example, an electronic device can include a camera to allow the electronic device to capture a video or image of a scene, a person, an object, etc. Additionally, cameras themselves are used in a number of configurations (e.g., handheld digital cameras, digital single-lens-reflex (DSLR) cameras, worn camera (including body-mounted cameras and head-borne cameras), stationary cameras (e.g., for security and/or monitoring), vehicle-mounted cameras, etc.).

A camera can receive light and capture image frames (e.g., still images or video frames) using an image sensor (which may include an array of photosensors). In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, a camera, or an electronic device implementing a camera, can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

Cameras can be configured with a variety of image-capture settings and/or image-processing settings to alter the appearance of an image. Image-capture settings can be determined and applied before or while an image is captured, such as ISO, exposure time (also referred to as exposure, exposure duration, and/or shutter speed), aperture size (also referred to as f/stop), focus (also referred to as lens position), and gain, among others. Image-processing settings can be configured for post-processing of an image, such as alterations to a contrast, brightness, saturation, sharpness, levels, curves, and colors, among others.

As mentioned above, a camera may focus light from a scene onto an image sensor using a lens. A position of the lens relative to the image sensor (e.g., a "lens position") may determine a depth of focus. For example, objects at a first depth may be in focus (e.g., appear sharp in an image) when the lens is at a first lens position. Additionally, objects at a second depth may be out of focus (e.g., appear blurry) when the lens is at the first lens position. Similarly, objects at the first depth may be out of focus when the lens is at the second lens position and objects at the second depth may be in focus when the lens is at the second lens position.

Some cameras perform an autofocus feature that may select a depth of focus and adjust a lens to the corresponding lens position. For example, Phase-Detection-Auto-Focus technique (PDAF), may use photodiodes of an image sensor of a camera to check whether light that is received by the lens of the camera from a desired depth of focus from different angles converge at the image sensor to create a focused image that is "in phase" or fails to converge and thus creates a blurry images that is "out of phase." If light received from different angles is out of phase, PDAF identifies a direction in which the light is out of phase to determine whether the lens needs to be moved forward or backward and identifies a phase disparity indicating how out of phase the light is to determine how far the lens must be moved. In some cases, the lens is moved to the position corresponding to optimal focus.

In many cases, a camera may determine that objects at a center of a field of view (FOV) of the camera are at a desired depth of focus and focus the lens on objects at the center of the FOV. In some cases, a user may indicate a portion of the scene (e.g., by selecting a portion of a preview image), and the camera may focus the lens on the portion of the scene (e.g., the camera may adjust the lens position such that objects in the indicated portion of the scene are in focus).

When a user captures a single image of a scene, the user may point the camera at the scene (e.g., composing the shot). While the user is pointing the camera, the camera may autofocus the lens on an ROI of the scene (e.g., on an object in the center of the FOV of the camera or an object indicated by the user). When the user is satisfied with the shot, the user may press a shutter button, and the camera may capture an image. Objects in the ROI may be in focus because the camera may have focused on the objects prior to the camera capturing the image.

When a camera is capturing video data (e.g., successive image frames), the camera may be autofocusing the lens while capturing the video data. When the camera is still, the camera may be able to autofocus on objects in an ROI (e.g., at a center of a FOV of the camera). However, while the camera is moving (e.g., panning), the camera may not have time to autofocus based on current frames. For example, initially a camera may be pointed at a first object at a first distance from the camera (e.g., the object may be in the center of the FOV of the camera). The camera may capture images of the object and may autofocus on the object (e.g., to a first depth of focus). The camera may begin to pan (e.g., reorient). While panning, the camera may capture images of other objects at other depths of focus. The camera may begin to autofocus on another object, but the camera may continue to pan such that the other object is no longer in the center of the FOV by the time the camera determines the lens position and adjusts the lens to the lens position. The result may be that images captured while the camera pans are blurry.

Extended reality (XR) may include virtual reality (VR), augmented reality (AR), and/or mixed reality (MR). Some XR head-mounted displays (HMDs) may implement video see through (VST). In VST, an XR HMD may capture images of a field of view (FOV) of a user and display the images to the user as if the user were viewing the FOV directly. While displaying the images of the FOV, the XR HMD may alter or augment the images providing the user with an altered or augmented view of the environment of the user (e.g., providing the user with an XR experience).

VST in an XR HMD may be a particularly challenging scenario for autofocusing. For example, for VST, a low photon-to-photon latency (e.g., the time between when a camera of the HMD captures an image and when the image is displayed by the HMD) may be critical. For instance, a photon-to-photon latency longer than 10 milliseconds (ms), for example, may be undesirable. For example, such a delay may cause dizziness or discomfort to a user. Additionally, users are prone to reorienting their heads frequently when using HMDs.

Systems, apparatuses, methods (also referred to as processes), and computer-readable media (collectively referred to herein as "systems and techniques") are described herein for predicting an ROI in an upcoming frame or image of a sequence of frames/images (e.g., in video data) and performing autofocus based on the ROI such that in a subsequent frame, the camera is focused on objects in the ROI. Predicting ROIs and performing autofocus based on predicted ROIs may result in sharper image frames than conventional autofocus techniques (e.g., when a camera capturing the video data pans while capturing the video data).

According to some aspects, the systems and techniques may track a pose (e.g., position and orientation) of a device (e.g., a handheld device or an HMD) based on movement data from an inertial-measurement unit (IMU) of the device. Further, the systems and techniques may predict an upcoming pose of the device (e.g., a pose of the device at an upcoming time) based on the movement data. For example, the systems and techniques may process the movement data using a machine-learning model trained to predict upcoming poses based on past and current movement data.

The systems and techniques may determine an ROI based on the upcoming pose of the device. For example, the systems and techniques may determine a current ROI (e.g., based on a default position within an FOV of the camera, such as the center of the FOV), a gaze of a user (e.g., based on images of the eyes of the user), a user selection (e.g., a tap of the user at a position of a display), and/or an object detected by the camera (e.g., an object in the scene detected by an object detector of the camera). The systems and techniques may determine the position of the current ROI relative to the FOV of the camera. The systems and techniques may predict the ROI for the upcoming frame based on the predicted pose and the current ROI. For example, based on the current ROI being in the center of the FOV, the systems and techniques may determine that the upcoming ROI is where the center of the FOV will be according to the upcoming pose of the device.

The systems and techniques may determine a lens position based on the ROI. For example, the systems and techniques may use an autofocus technique (such as PDAF) to determine a lens position for the camera to focus on objects in the upcoming ROI. For instance, the camera may capture a current image of the scene. The upcoming ROI may be in current image of the scene (e.g., off-center based on the direction of the movement of the camera). The systems and techniques may determine a lens position based on pixels of the upcoming ROI in the current image of the camera.

The systems and techniques may adjust the lens according to the lens position. For example, the systems and techniques may cause the camera to adjust the position of the lens such that the lens is in the lens position at the time when the upcoming image is captured.

The systems and techniques may continually predict upcoming ROIs, determine lens positions for the upcoming ROIs and adjust the lens according to the determined lens positions such that each frame is captured based on a predicted ROI and previously determined lens position. This may result in image frames that are more in focus than images frames captured according to a conventional autofocus technique.

In general, algorithms that predict poses of devices based on gyroscope measurements (e.g., gyro-prediction algorithms) are quite stable and in some cases, are included in spatial-feature enhanced high dynamic resolution (SFE-HDR) solutions. A predictive AF algorithm may help to reduce a number of defocused frames in high frame rate (HFR) Videos, which may result in a better user experience. A predictive AF algorithm may be used in XR devices where the image focus needs to be very fast. The systems and techniques may have minimal impact on the latency and performance as gyro prediction algorithms are quite fast and efficient. Additionally, there is well-defined fallback mechanism to avoid any image quality degradation.

While VST for XR is given as an example, the systems and techniques are not limited to VST for XR. The systems and techniques may be used in any system for capturing image data, including systems for capturing successive image frames (e.g., of video data).

Various aspects of the application will be described with respect to the figures below.

FIG. 1 is a block diagram illustrating an example architecture of an image-processing system 100, according to various aspects of the present disclosure. The image-processing system 100 includes various components that are used to capture and process images, such as an image of a scene 106. The image-processing system 100 can capture image frames (e.g., still images or video frames). In some cases, the lens 108 and image sensor 118 (which may include an analog-to-digital converter (ADC)) can be associated with an optical axis. In one illustrative example, the photosensitive area of the image sensor 118 (e.g., the photodiodes) and the lens 108 can both be centered on the optical axis.

In some examples, the lens 108 of the image-processing system 100 faces a scene 106 and receives light from the scene 106. The lens 108 bends incoming light from the scene toward the image sensor 118. The light received by the lens 108 then passes through an aperture of the image-processing system 100. In some cases, the aperture (e.g., the aperture size) is controlled by one or more control mechanisms 110. In other cases, the aperture can have a fixed size.

The one or more control mechanisms 110 can control exposure, focus, and/or zoom based on information from the image sensor 118 and/or information from the image processor 124. In some cases, the one or more control mechanisms 110 can include multiple mechanisms and components. For example, the control mechanisms 110 can include one or more exposure-control mechanisms 112, one or more focus-control mechanisms 114, and/or one or more zoom-control mechanisms 116. The one or more control mechanisms 110 may also include additional control mechanisms besides those illustrated in FIG. 1. For example, in some cases, the one or more control mechanisms 110 can include control mechanisms for controlling analog gain, flash, HDR, depth of field, and/or other image capture properties.

The focus-control mechanism 114 of the control mechanisms 110 can obtain a focus setting. In some examples, focus-control mechanism 114 stores the focus setting in a memory register. Based on the focus setting, the focus-control mechanism 114 can adjust the position of the lens 108 relative to the position of the image sensor 118. For example, based on the focus setting, the focus-control mechanism 114 can move the lens 108 closer to the image sensor 118 or farther from the image sensor 118 by actuating a motor or servo (or other lens mechanism), thereby adjusting the focus. In some cases, additional lenses may be included in the image-processing system 100. For example, the image-processing system 100 can include one or more microlenses over each photodiode of the image sensor 118. The microlenses can each bend the light received from the lens 108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 110, the image sensor 118, and/or the image processor 124. The focus setting may be referred to as an image capture setting and/or an image processing setting. In some cases, the lens 108 can be fixed relative to the image sensor and the focus-control mechanism 114.

The exposure-control mechanism 112 of the control mechanisms 110 can obtain an exposure setting. In some cases, the exposure-control mechanism 112 stores the exposure setting in a memory register. Based on the exposure setting, the exposure-control mechanism 112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 118 (e.g., ISO speed or film speed), analog gain applied by the image sensor 118, or any combination thereof. The exposure setting may be referred to as an image capture setting and/or an image processing setting.

The zoom-control mechanism 116 of the control mechanisms 110 can obtain a zoom setting. In some examples, the zoom-control mechanism 116 stores the zoom setting in a memory register. Based on the zoom setting, the zoom-control mechanism 116 can control a focal length of an assembly of lens elements (lens assembly) that includes the lens 108 and one or more additional lenses. For example, the zoom-control mechanism 116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 108 in some cases) that receives the light from the scene 106 first, with the light then passing through a focal zoom system between the focusing lens (e.g., lens 108) and the image sensor 118 before the light reaches the image sensor 118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 116 moves one or more of the lenses in the focal zoom system, such as the negative lens and one or both of the positive lenses. In some cases, zoom-control mechanism 116 can control the zoom by capturing an image from an image sensor of a plurality of image sensors (e.g., including image sensor 118) with a zoom corresponding to the zoom setting. For example, the image-processing system 100 can include a wide-angle image sensor with a relatively low zoom and a telephoto image sensor with a greater zoom. In some cases, based on the selected zoom setting, the zoom-control mechanism 116 can capture images from a corresponding sensor.

The image sensor 118 includes one or more arrays of photodiodes or other photosensitive elements. Each photodiode measures an amount of light that eventually corresponds to a particular pixel in the image produced by the image sensor 118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an infrared (IR) cut filter, an ultraviolet (UV) cut filter, a band-pass filter, low-pass filter, high-pass filter, or the like). The image sensor 118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 110 may be included instead or additionally in the image sensor 118. The image sensor 118 may be a charge-coupled device (CCD) sensor, an electron-multiplying CCD (EMCCD) sensor, an active-pixel sensor (APS), a complementary metal-oxide semiconductor (CMOS), an N-type metal-oxide semiconductor (NMOS), a hybrid CCD/CMOS sensor (e.g., sCMOS), or some other combination thereof.

Figure 15:
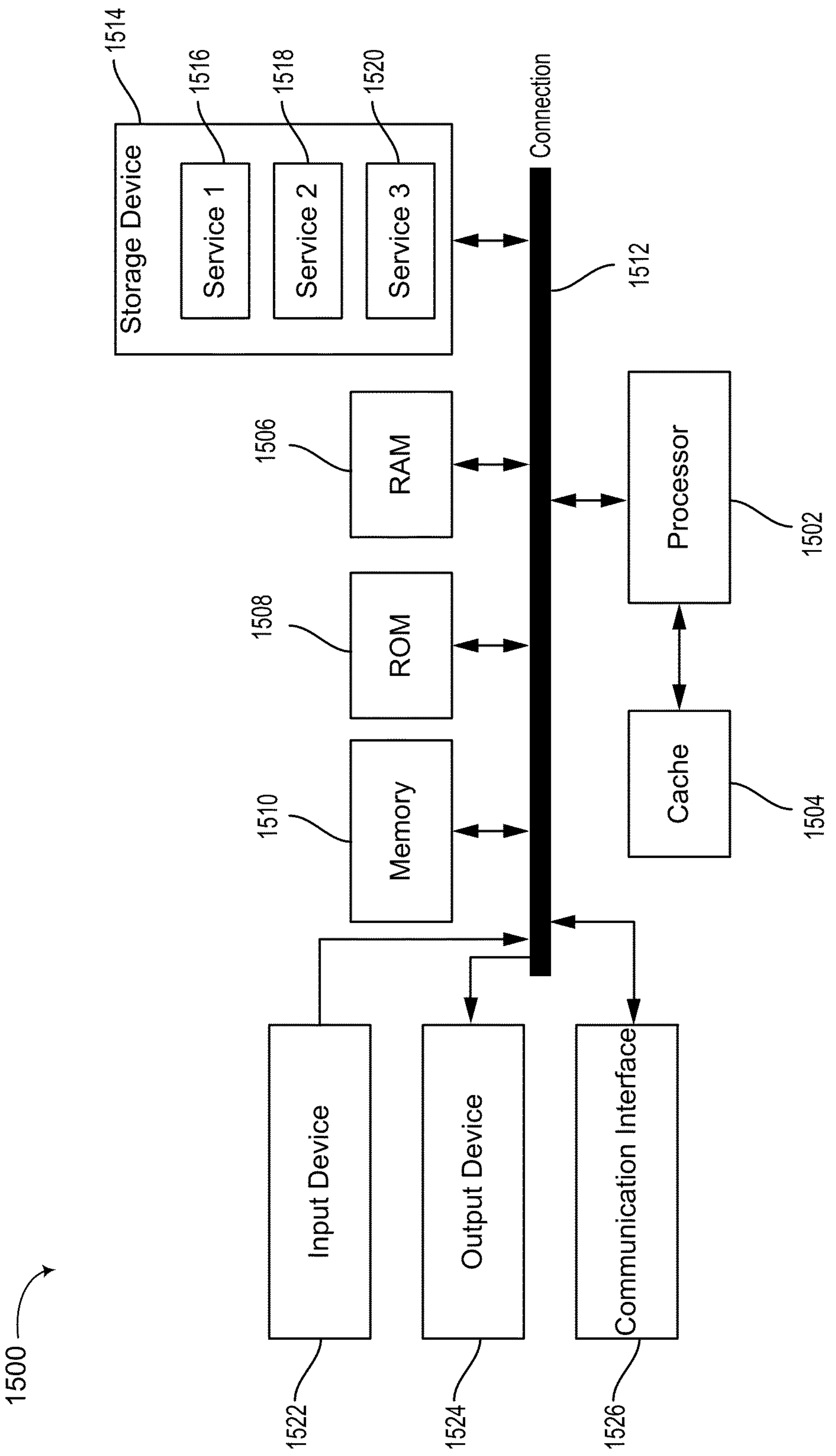
FIG. 15 is a block diagram illustrating an example computing-device architecture of an example computing device which can implement the various techniques described herein.

The image processor 124 may include one or more processors, such as one or more image signal processors (ISPs) (including ISP 128), one or more host processors (including host processor 126), and/or one or more of any other type of processor discussed with respect to the computing-device architecture 1500 of FIG. 15. The host processor 126 can be a digital signal processor (DSP) and/or other type of processor. In some implementations, the image processor 124 is a single integrated circuit or chip (e.g., referred to as a system-on-chip or SoC) that includes the host processor 126 and the ISP 128. In some cases, the chip can also include one or more input/output ports (e.g., input/output (I/O) ports 130), central processing units (CPUs), graphics processing units (GPUs), broadband modems (e.g., third generation (3G), fourth generation (4G) or long-term evolution (LTE), fifth generation (5G), etc.), memory, connectivity components (e.g., Bluetooth™, Global Positioning System (GPS), etc.), any combination thereof, and/or other components. The I/O ports 130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 126 can communicate with the image sensor 118 using an I2C port, and the ISP 128 can communicate with the image sensor 118 using an MIPI port.

The image processor 124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 124 may store image frames and/or processed images in random-access memory (RAM) 120, read-only memory (ROM) 122, a cache, a memory unit, another storage device, or some combination thereof.

Various input/output (I/O) devices 132 may be connected to the image processor 124. The I/O devices 132 can include a display screen, a keyboard, a keypad, a touchscreen, a trackpad, a touch-sensitive surface, a printer, any other output devices, any other input devices, or any combination thereof. In some cases, a caption may be input into the image-processing device 104 through a physical keyboard or keypad of the I/O devices 132, or through a virtual keyboard or keypad of a touchscreen of the I/O devices 132. The I/O devices 132 may include one or more ports, jacks, or other connectors that enable a wired connection between the image-processing system 100 and one or more peripheral devices, over which the image-processing system 100 may receive data from the one or more peripheral device and/or transmit data to the one or more peripheral devices. The I/O devices 132 may include one or more wireless transceivers that enable a wireless connection between the image-processing system 100 and one or more peripheral devices, over which the image-processing system 100 may receive data from the one or more peripheral device and/or transmit data to the one or more peripheral devices. The peripheral devices may include any of the previously discussed types of the I/O devices 132 and may themselves be considered I/O devices 132 once they are coupled to the ports, jacks, wireless transceivers, or other wired and/or wireless connectors.

In some cases, the image-processing system 100 may be a single device. In some cases, the image-processing system 100 may be two or more separate devices, including an image-capture device 102 (e.g., a camera) and an image-processing device 104 (e.g., a computing device coupled to the camera). In some implementations, the image-capture device 102 and the image-capture device 102 may be coupled together, for example via one or more wires, cables, or other electrical connectors, and/or wirelessly via one or more wireless transceivers. In some implementations, the image-capture device 102 and the image-processing device 104 may be disconnected from one another.

As shown in FIG. 1, a vertical dashed line divides the image-processing system 100 of FIG. 1 into two portions that represent the image-capture device 102 and the image-processing device 104, respectively. The image-capture device 102 includes the lens 108, control mechanisms 110, and the image sensor 118. The image-processing device 104 includes the image processor 124 (including the ISP 128 and the host processor 126), the RAM 120, the ROM 122, and the I/O device 132. In some cases, certain components illustrated in the image-capture device 102, such as the ISP 128 and/or the host processor 126, may be included in the image-capture device 102. In some examples, the image-processing system 100 can include one or more wireless transceivers for wireless communications, such as cellular network communications, 802.11 wi-fi communications, wireless local area network (WLAN) communications, or some combination thereof.

The image-processing system 100 can be part of, or implemented by, a single computing device or multiple computing devices. In some examples, the image-processing system 100 can be part of an electronic device (or devices) such as a camera system (e.g., a digital camera, an internet protocol (IP) camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an head-mounted device (HMD), smart glasses, etc.), an IoT (Internet-of-Things) device, a smart wearable device, a video streaming device, an Internet Protocol (IP) camera, or any other suitable electronic device(s).

While the image-processing system 100 is shown to include certain components, one of ordinary skill will appreciate that the image-processing system 100 can include more components than those shown in FIG. 1. The components of the image-processing system 100 can include software, hardware, or one or more combinations of software and hardware. For example, in some implementations, the components of the image-processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 100.

In some examples, the computing-device architecture 1500 shown in FIG. 15 and further described below can include the image-processing system 100, the image-capture device 102, the image-processing device 104, or a combination thereof.

Some modern cameras include automatic focusing functionality ("autofocus") that allows the camera to focus automatically prior to capturing the desired image. Various autofocus technologies exist. Active autofocus ("active AF") relies on determining a range between the camera and a subject of the image via a range sensor of the camera, typically by emitting infrared lasers or ultrasound signals and receiving reflections of those signals. While active AF works well in many cases and can be fairly quick, cameras with active AF can be bulky and expensive. Active AF can fail to properly focus on subjects that are very close to the camera lens (macro photography), as the range sensor is not perfectly aligned with the camera lens, and this difference is exacerbated the closer the subject is to the camera lens. Active AF can also fail to properly focus on faraway subjects, as laser or ultrasound transmitters used in the range sensors that are used for active AF are typically not very strong. Active AF also often fails to properly focus on subjects on the other side of a window than the camera, as the range sensor typically determines the range to the window rather than to the subject.

Passive autofocus ("passive AF") uses the camera's own image sensor to focus the camera, and thus does not require additional sensors to be integrated into the camera. Passive AF techniques include Contrast Detection Auto Focus (CDAF), Phase Detection Auto Focus (PDAF), and in some cases hybrid systems that use both.

In CDAF, the lens of a camera moves through a range of lens positions, typically with pre-specified distance intervals between each tested lens position and attempts to find a lens position at which contrast between the subject's pixels and background pixels are maximized. CDAF relies on trial and error and has high latency as a result. The CDAF process also requires the motor that moves the lens to be actuated and stopped repeatedly in a short span of time every time the camera needs to focus for a photo, which puts stress on components and expends a fair amount of battery power. The camera can still fail to find a satisfactory focus using CDAF, for example if the distance interval between tested lens positions is too large, as the ideal focus may actually be between tested lens positions. CDAF may also struggle in images of subjects without high-contrast features, such as walls, or in images taken in low-light or high-light conditions where lighting conditions fade or blend features that would have higher contrast in different lighting conditions.

In PDAF, photodiodes within the camera are used to check whether light that is received by the lens of a camera from different angles converge to create a focused image that is "in phase" or fails to converge and thus creates a blurry image that is "out of phase." If light received from different angles is out of phase, the camera identifies a direction in which the light is out of phase to determine whether the lens needs to be moved forward or backward and identifies a phase disparity indicating how out of phase the light is to determine how far the lens must be moved. In some cases, the lens is moved to the position corresponding to optimal focus. Compared to CDAF, PDAF generally focuses the camera more quickly by not relying on trial and error. PDAF also typically uses less power and wears components less than CDAF by actuating the motor for a single lens motion rather than for many small and repetitive motions. Like CDAF, however, PDAF may also struggle to properly focus in low-light conditions and high-light conditions. Some PDAF solutions also use masks or shielding as discussed further below, which reduces the total amount of light that is received by certain photodiodes. In some cases, a hybrid autofocus solution may be employed that uses PDAF to move the lens to a first position, then uses CDAF to check contrast at a number of lens positions within a defined distance/range of the first position in order to help compensate for any slight errors or inaccuracies in the PDAF autofocus.

Figure 2A:
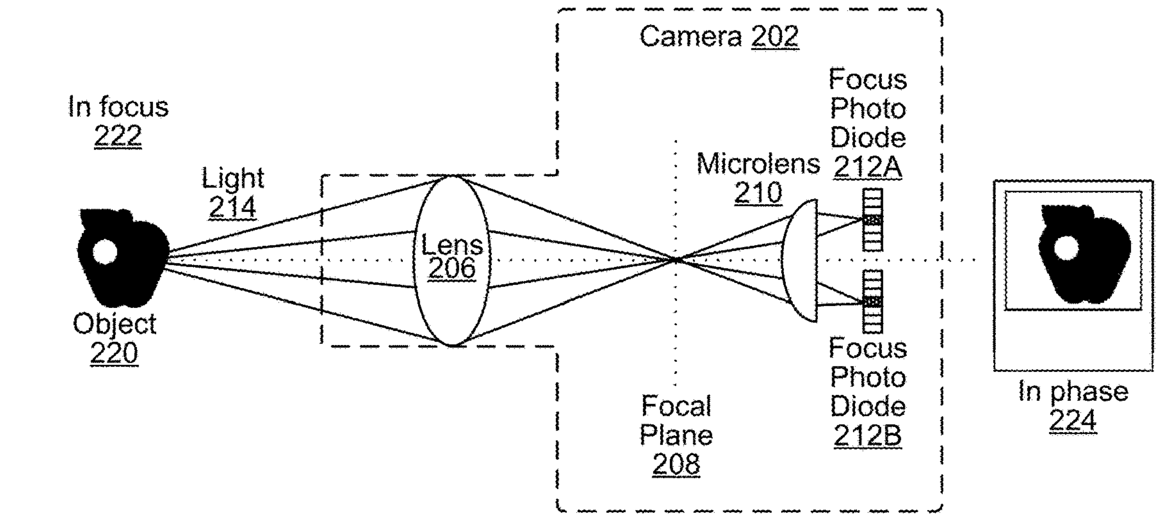
FIG. 2A is a diagram illustrating an example Phase Detection Auto Focus (PDAF) camera system in a state that is in phase and therefore in focus.

FIG. 2A is a diagram illustrating an example Phase Detection Auto Focus (PDAF) camera system 202 in a state 222 in phase and therefore in focus. Rays of light 214 may travel from an object 220 (e.g., an apple) through a lens 206 that focuses light 214 from a scene onto an image sensor (not pictured in its entirety). The image sensor may include an example focus photodiode 212*a* and an example focus photodiode 212*b*. Focus photodiode 212*a* and focus photodiode 212*b* may correspond to focus pixels. Focus photodiode 212*a* and focus photodiode 212*b* may be associated with one or two focus pixels (e.g., focus photodiode 212*a* and focus photodiode 212*b* may be two photodiodes of a single focus pixel sharing a single microlens 210 or focus photodiode 212*a* may be associated with a first focus pixel and focus photodiode 212*b* may be associated with a second focus pixel, both focus pixels sharing a single microlens 210) of the pixel array of the image sensor. In some cases, light 214 may travel through microlens 210 before falling on focus photodiode 212*a* and focus photodiode 212*b*. When camera system 202 is in the "in focus" state 222 of FIG. 2A, rays of light 214 may ultimately converge at a plane that corresponds to the position of focus photodiode 212*a* and focus photodiode 212*b*. When camera system 202 is in the "in focus" state 222 of FIG. 2A, rays of light 214 may also converge at a focal plane 208 (also known as an image plane) after passing through the lens 206 but before reaching the microlens 210 and/or focus photodiode 212*a* and focus photodiode 212*b*.

Because the camera system 202 of FIG. 2A is in an in-focus state 222, data from focus photodiode 212*a* and focus photodiode 212*b* is aligned. The alignment of data from focus photodiode 212*a* and focus photodiode 212*b* is represented by an image 224 showing a clear and sharp representation of object 220 due to the alignment. In contrast FIG. 2B includes an image 234 which includes two misaligned representations of object 220 based on camera system 202 being in a "front focus" state 232 in FIG. 2B. Similar to FIG. 2B, FIG. 2C includes an image 244 which includes two misaligned representations of object 220 based on camera system 202 being in a "back focus" state 242 in FIG. 2C. The in-focus state 222 may also be referred to as an "in-phase" state, as the data from focus photodiode 212*a* and focus photodiode 212*b* have no phase disparity, or have very little phase disparity (e.g., phase disparity falling below a predetermined phase disparity threshold).

Figure 2B:
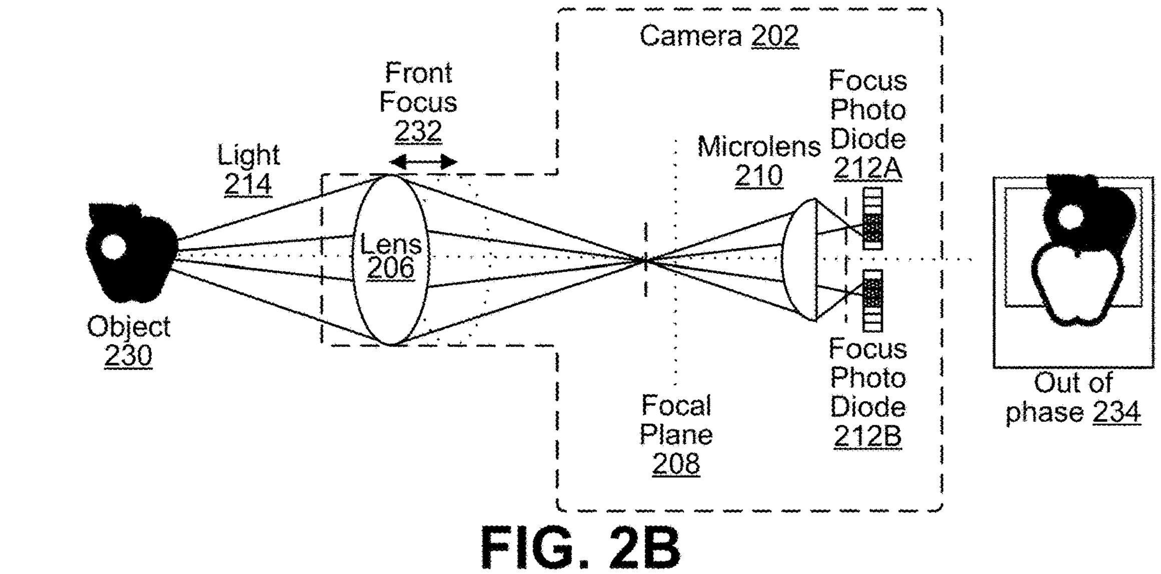
FIG. 2B is a diagram illustrating the example PDAF camera system of FIG. 2A in a state that is out of phase with a front focus.

FIG. 2B is a diagram illustrating the example the PDAF camera system 202 of FIG. 2A in a state 232 that is out of phase with a front focus. The PDAF camera system 202 of FIG. 2B is the same as the PDAF camera system 202 of FIG. 2A, but lens 206 is moved closer to object 220 and farther from the focus photodiode 212*a* and focus photodiode 212*b*. Camera system 202 is therefore in a "front focus" state 232. The lens position for the "in focus" state 232 is illustrated in FIG. 2B as a dotted outline for reference, with a double-sided arrow indicating movement of the lens between the "front focus" lens position of state 232 and the "in focus" lens position of state 222.

When the camera system 202 is in the "front focus" state 232 of FIG. 2B, rays of light 214 may ultimately converge at a plane (denoted by a dashed line) before the position of focus photodiode 212*a* and focus photodiode 212*b*, that is, between the microlens 210 and focus photodiode 212*a* and focus photodiode 212*b*. Rays of light 214 may also converge at a position (denoted by another dashed line) before focal plane 208 after passing through the lens 206 but before reaching the microlens 210 and/or focus photodiode 212*a* and focus photodiode 212*b*. Because light 214 in camera system 202 of FIG. 2B is out of phase in the "front focus" state 232, data from focus photodiode 212*a* and focus photodiode 212*b* is misaligned. The misalignment of data from focus photodiode 212*a* and focus photodiode 212*b* is represented by image 234 showing misaligned black-colored and white-colored representations of object 220, where the direction of misalignment in the image 234 is related to the front focus state 232, and the distance of misalignment in the image 234 is related to the distance of the lens 206 from its position in the focused state 222.

Figure 2C:
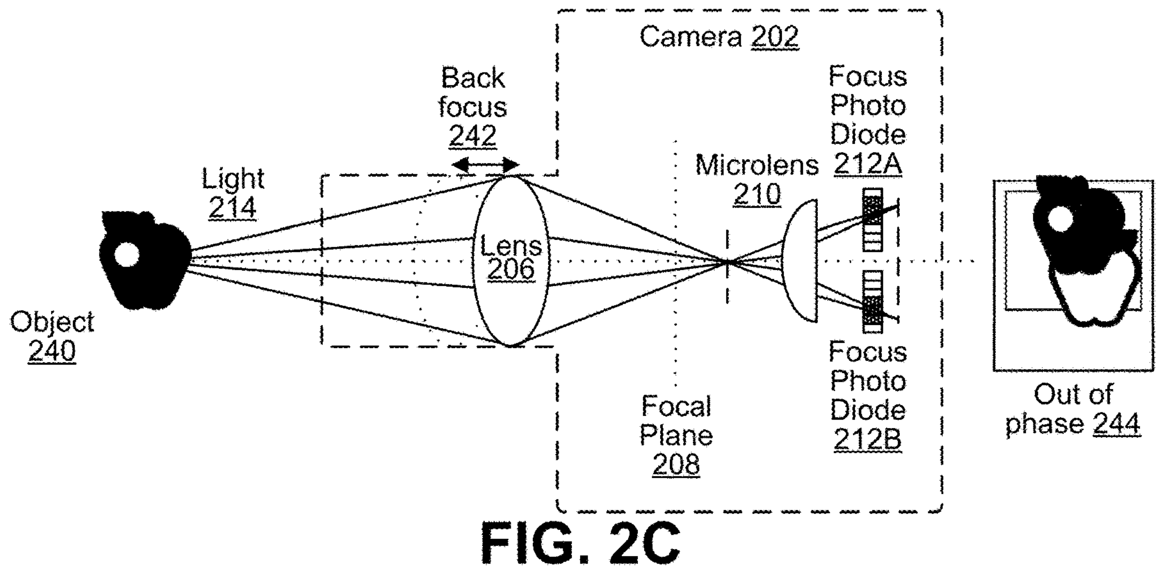
FIG. 2C is a diagram illustrating the example PDAF camera system of FIG. 2A in a state that is out of phase with a back focus.

FIG. 2C is a diagram illustrating the example the PDAF camera system 202 of FIG. 2A in a state 242 that is out of phase with a back focus. The PDAF camera system 202 of FIG. 2C is the same as the PDAF camera system 202 of FIG. 2A, but lens 206 is moved farther from object 220 and closer to the focus photodiode 212*a* and focus photodiode 212*b*. Therefore, camera system 202 is in a "back focus" state 242 (also known as a "rear focus" state). The lens position for the "in focus" state 222 is illustrated as a dotted outline for reference, with a double-sided arrow indicating movement of the lens between the "back focus" lens position of state 242 and the "in focus" lens position of state 222.

When camera system 202 is in the "back focus" state 242 of FIG. 2C, rays of light 214 may ultimately converge at a plane (denoted by a dashed line) beyond the position of the focus photodiode 212*a* and focus photodiode 212*b*. Rays of light 214 may also converge at a position (denoted by another dashed line) beyond the focal plane 208 after passing through the lens 206 but before reaching the microlens 210 and/or focus photodiode 212*a* and focus photodiode 212*b*. Because light 214 in camera system 202 of FIG. 2C is out of phase in the "back focus" state 242, data from focus photodiode 212*a* and focus photodiode 212*b* is misaligned. The misalignment of data from focus photodiode 212*a* and focus photodiode 212*b* is represented by image 244 showing misaligned black-colored and white colored representations of object 220, where the direction of misalignment in image 244 is related to the back focus state 242, and the distance of misalignment in image 244 is related to the distance of the lens 206 from its position in the focused state 222.

When rays of light 214 converge before the plane of focus photodiode 212*a* and focus photodiode 212*b* as in front focus state 232 of FIG. 2B or beyond the plane of focus photodiode 212*a* and focus photodiode 212*b* as in back focus state 242 of FIG. 2C, the resulting image produced by the image sensor may be out-of-focus or blurred. In the case that the image is out-of-focus, lens 206 can be moved forward (toward object 220 and away from focus photodiode 212*a* and focus photodiode 212*b*) if lens 206 is in the back focus state 242, or can be moved backward (away from object 220 and toward focus photodiode 212*a* and focus photodiode 212*b*) if the lens is in the front focus state 232. Lens 206 may be moved forward or backward within a range of positions which in some cases has a predetermined length R representing a possible range of motion of the lens in camera system 202. Camera system 202, or a computing system therein, may determine a distance and direction of adjusting the position of lens 206 to bring the image into focus based on one or more phase disparity values calculated as differences between data from two focus photodiodes that receive light from different directions, such as focus photodiode 212*a* and focus photodiode 212*b*. The direction of movement of lens 206 may correspond to a direction in which the data from the focus photodiode 212*a* and focus photodiode 212*b* is determined to be out of phase, or whether the phase disparity is positive or negative. The distance of movement of lens 206 may correspond to a degree or amount to which the data from the focus photodiode 212*a* and focus photodiode 212*b* is determined to be out of phase, or the absolute value of the phase disparity.

Camera system 202 may include motors and/or actuators (not pictured) that move lens 206 between lens positions corresponding to the different states (e.g., state 222, state 232, and/or state 242). Camera system 202 of FIG. 2A, FIG. 2B, and FIG. 2C may in some cases also include various additional non-illustrated components, such as lenses, mirrors, partially reflective (PR) mirrors, prisms, photodiodes, image sensors, and/or other components sometimes found in cameras or other optical equipment. In some cases, the focus photodiode 212*a* and focus photodiode 212*b* may be referred to as PDAF photodiodes, PDAF diodes, phase detection (PD) photodiodes, PD diodes, PDAF pixel photodiodes, PDAF pixel diodes, PD pixel photodiodes, PD pixel diodes, focus pixel photodiodes, focus pixel diodes, pixel photodiodes, pixel diodes, or in some cases simply photodiodes or diodes.

Figure 3A:
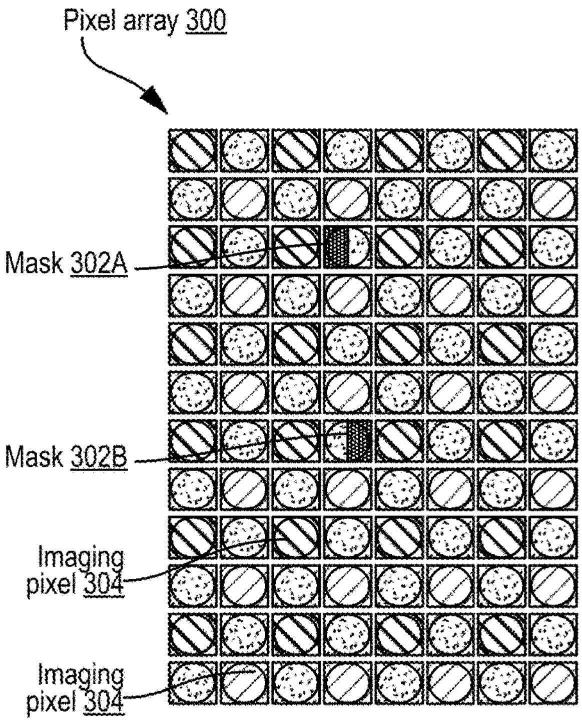
FIG. 3A is a diagram illustrating a top-down view of an example pixel array of an image sensor with masks partially covering focus pixel photodiodes.

FIG. 3A is a diagram illustrating a top-down view of an example pixel array 300 of an image sensor with masks partially covering focus pixel photodiodes. An image sensor of a camera system may include an array of pixels, such as pixel array 300 of FIG. 3A. Pixel array 300 may include an array of photodiodes, which is not shown in FIG. 2A as is the photodiodes are covered by color filters (e.g., Bayer filters or other types of color filters as discussed below) and microlenses 318 as identified in the legend 310 of FIG. 3B. Photodiodes of focus pixels are also partially covered by masks 320 in pixel array 300 of FIG. 3A.

Figure 3B:
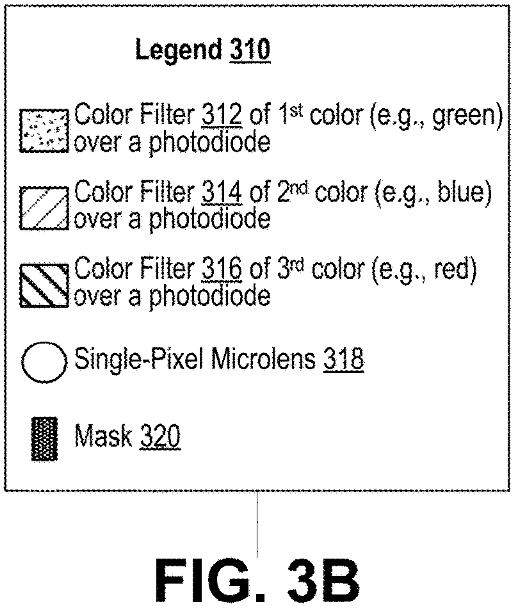
FIG. 3B includes a legend identifying elements of FIG. 3A, FIG. 3C, and FIG. 3D.
Figure 3C:
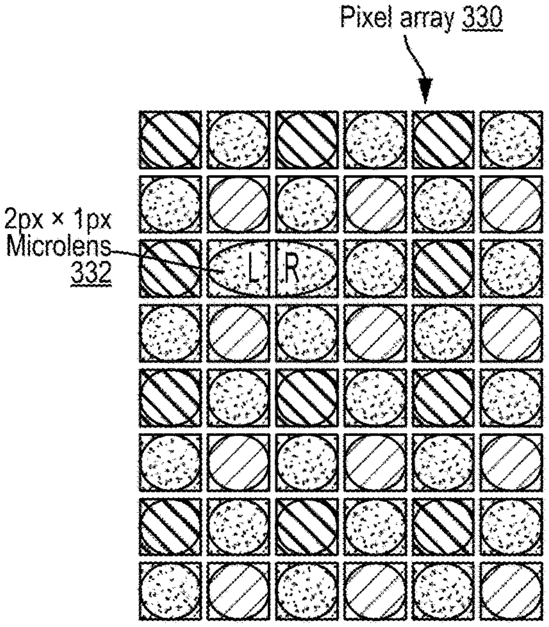
FIG. 3C is a diagram illustrating a top-down view of another example pixel array of an image sensor with masks partially covering focus pixel photodiodes.
Figure 3D:
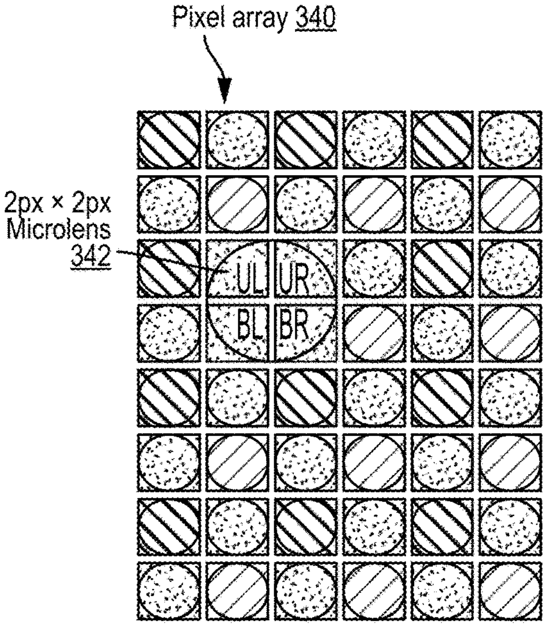
FIG. 3D is a diagram illustrating a top-down view of another example pixel array of an image sensor with masks partially covering focus pixel photodiodes.

FIG. 3B includes a legend 310 identifying elements of FIG. 3A, FIG. 3C and FIG. 3D. Legend 310 identifies that a circle represents a microlens 318 of a single pixel, and that a dark shaded rectangle represents a mask 320. legend 310 of FIG. 3B also identifies that squares with three different patterns each represent color filters 312, 314, and 316, each color filter being for one of three different colors: red, green, or blue. That is, squares of the first pattern represent a color filter 312 for a first color, which may for example be green; squares of the second pattern represent a color filter 314 for a second color, which may for example be blue; and squares of the third pattern represent a color filter 316 for a third color, which may for example be red. These color filters are arranged in color filter arrays (CFAs) over an array of photodiodes in the pixel arrays 300, 330, and 340 of FIG. 3A, FIG. 3C, and FIG. 3D respectively. The colors (and number of colors) identified in legend 310 of FIG. 3B, and the arrangements of color filters illustrated in the pixel arrays 300, 330, and 340 of FIG. 3A, FIG. 3C, and FIG. 3D, should be understood to be exemplary and should not be construed as limiting. Red, green, and blue color filters are traditionally used in image sensors and are often referred to as Bayer filters. Bayer filter CFAs often include more green Bayer filters than red or blue Bayer filters, for example in a proportion of 50% green, 25% red, 25% blue, to mimic sensitivity to green light in human eye physiology. Bayer filter CFAs with these proportions are sometimes referred to as BGGR, RGBG, GRGB, or RGGB, and are reflected in the presence of the color filter 312 in higher proportion than the color filters 314 and 316 in the pixel arrays 300, 330, and 340 of FIG. 3A, FIG. 3C, and FIG. 3D. Sometimes, in such Bayer filter CFAs, green is treated as two colors, labeled "Gr" and "Gb" respectively. Some CFAs use alternate color schemes and can even include more or fewer colors. For example, some CFAs use cyan, yellow, and magenta color filters instead of the traditional red, green, and blue Bayer color filter scheme. In an arrangement referred to as cyan yellow yellow magenta (CYYM), 50% of the color filters are yellow, while 25% are cyan and 25% are magenta. Some filters also add a fourth green filter to the three cyan, yellow, and magenta filters, together referred to as a cyan yellow green magenta (CYGM) filter. Some CFAs use red, green, blue and "emerald" or cyan, referred to as an RGBE color scheme. In some cases, some mix or combination of the Bayer, CYYM, CYGM, or RGBE color schemes may be used. In some cases, color filters of one or more of the colors of the Bayer, CYYM, CYGM, or RGBE color schemes may be omitted, in some cases leaving only two colors or even one color. While legend 310 of FIG. 3B lists precisely three color filters 312, 314, and 316, and provides green, red, and blue as examples to adhere to the traditional Bayer filter color scheme, it should be understood that more than three colors or less than three colors may alternately be used in the CFA, and that the colors may vary, for example including red, green, blue, cyan, magenta, yellow, emerald, white (transparent), or some combination thereof. Some image sensors, such as the Foveon X3® sensor, may lack color filters altogether, instead opting to use different photodiodes throughout the pixel array (optionally vertically stacked), the different photodiodes having different spectral sensitivity curves and therefore responding to different wavelengths of light. Monochrome image sensors may also lack color filters and therefore lack color depth. Use of color filters in an image sensor used with the camera systems described further herein should therefore be considered optional.

Pixel array 300 of FIG. 3A is illustrated with two pixels that are used for phase detection auto focus (PDAF), which are referred to herein as focus pixels, but may alternately be referred to as PDAF pixels or phase detection (PD) pixels. Other pixels not used for PDAF may simply be referred to as imaging pixels 304. In pixel array 300 of FIG. 3A, any pixel without a mask 320 is an imaging pixel 304, even though only two imaging pixels 304 are specifically labeled. While two focus pixels are illustrated in pixel array 300 of FIG. 3A, both in the same column but with three rows of imaging pixels in between, a different pixel array (not pictured) may have any number of focus pixels (i.e., one or more focus pixels), which may be arranged in any possible pattern or arrangement. In some cases, patterns of focus pixels may repeat across a pixel array, for example in "tiles" that are 8 pixels by 8 pixels in size, or 16 pixels by 16 pixels in size.

The two focus pixels illustrated in FIG. 3A are both partially covered by masks 320, the two masks 320 labeled as mask 302*a* and mask 302*b*, respectively. Each of the masks 320 may be a mask or shield made of an opaque and/or reflective material, such as a metal. Each mask 320 limits the amount and direction of light that strikes the photodiode of the focus pixel that is partially covered by the mask. The mask 302*a* and mask 302*b* each limit how much light reaches and strikes the underlying focus pixel photodiode from a particular direction and are disposed over two different focus pixel diodes in an opposite direction to produce a pair of left and right images. For example, the mask 302*a* is disposed over a left side of a first focus pixel, leaving the right side of that first focus pixel to receive light entering from the right side (the right image). The mask 302*b* is disposed over a right side of a second focus pixel, leaving the left side of that second focus pixel to receive light entering from the left side (the left image). Because the two focus pixels are both illustrated as half-covered by the masks 320, their focus photodiodes effectively receive 50% of the light that an imaging photodiode (which would not be covered by a mask) in the same location on the pixel array would receive.

Any number of focus pixels may be included in a pixel array of an image sensor. Left and right pairs of focus pixels may be adjacent to one another, or may be spaced apart by one or more imaging pixels 304. The two pixels from a left and right pair of focus pixels may both be in the same row and/or same column of the pixel array, may be in a different row and/or different column, or some combination thereof. While masks 302*a* and 302*b* are shown within pixel array 300 as masking left and right portions of the focus pixel photodiodes, this is for exemplary purposes only. Focus pixel masks 320 may instead mask top or bottom portions of the focus pixel photodiodes, thus generating top and bottom images (or "up" and "down" images) from the focus pixel data received by the focus pixels. Like the left and right pairs of focus pixels, top and down pairs of focus pixels may both be in the same row and/or same column of the pixel array, may be in a different row and/or different column, or some combination thereof. A pixel array of an image sensor may have a focus pixel with a mask 320 over a left side of one focus pixel, a mask 320 over a right side of a second focus pixel, a mask 320 over a top side of a third focus pixel, a mask 320 over a bottom side of a fourth focus pixel, and optionally more focus pixels with any of these types of masks 320. Using focus pixels with masks 320 along multiple axes (e.g., left-right pairs of focus pixels as well as top-down pairs of focus pixels) can improve autofocus quality. One reason why autofocus quality can be improved by using focus pixels with masks 320 along multiple axes is because use of masks 320 along left and right sides of focus pixel photodiodes alone for PDAF can lead to poor focus on scenes or subjects with many horizontal edges (i.e., lines that appear along a left-right axis relative to the orientation of the focus pixels and masks 320), and use of masks 320 along top and bottom sides of focus pixel photodiodes alone for PDAF can lead to poor focus on scenes or subjects with many vertical edges (i.e., lines that appear along an up-down axis relative to the orientation of the focus pixels and masks 320).

Some PDAF camera systems do not use masks 320 on focus pixels as in FIG. 3A, but instead cover multiple pixels under a single microlens, which may alternately be referred to as an on-chip lens (OCL). FIG. 3C illustrates a top-down view of a pixel array configuration with two side-by-side focus pixels covered by a 2-pixel-by-1-pixel microlens. FIG. 3D illustrates a top-down view of a pixel array configuration with four neighboring focus pixels covered by a 2-pixel-by-2-pixel microlens. The pixel arrays 330 and 340 of FIG. 3C and FIG. 3D can also be interpreted based on legend 310 of FIG. 3B.

Referring to FIG. 3C and FIG. 3D, the 2-pixel-by-1-pixel microlens 332 of FIG. 3C and the 2-pixel-by-2-pixel microlens 342 of FIG. 3D both span multiple adjacent focus pixels (i.e., the microlenses cover multiple adjacent focus pixel photodiodes), and both can limit the amount and/or direction of light that strikes the focus pixel photodiodes of those focus pixels. The microlens 332 of FIG. 3C covers two horizontally-adjacent focus pixels of a pixel array 330, such that focus pixel data from both focus photodiodes may be generated, with focus pixel data from the left one of the focus pixels (labeled with an "L") representing light approaching from the left side of the pixel array 330, and focus pixel data from the right one of the focus pixels (labeled with an "R") representing light approaching from the right side of the pixel array 330. While the microlens 332 is shown within pixel array 330 as spanning left and right adjacent pixels/diodes (e.g., in a horizontal direction), this is for exemplary purposes only. A 2-pixel-by-1-pixel microlens 332 may instead span top and bottom adjacent pixels/diodes (e.g., in a vertical direction), thus generating an up and down (or top and bottom) pair of focus photodiodes and corresponding pixel data.

Similarly, the microlens 342 of FIG. 3D covers a 2-pixel-by-2-pixel square of four adjacent focus pixels of a pixel array 340, such that focus pixel data from all four photodiodes in the square may be generated. The focus pixel data from the four adjacent focus pixels thus includes focus pixel data from an upper-left pixel (labeled "UL" in FIG. 3D) representing light approaching from the upper-left of the pixel array 340, focus pixel data from an upper-right pixel (labelled "UR" in FIG. 3D) representing light approaching from the upper-right of the pixel array 340, focus pixel data from a bottom-left pixel (labeled "BL" in FIG. 3D) representing light approaching from the bottom-left of the pixel array 340, and focus pixel data from a bottom right pixel (labeled "BR" in FIG. 3D) representing light approaching from the bottom right of the pixel array 340. The configurations of pixel arrays 330 and 340 of FIG. 3C and FIG. 3D are exemplary; any number of focus pixels may be included within a pixel array, and may include one or more horizontally-oriented (left-right) 2-pixel-by-1-pixel microlenses 332, one or more vertically-oriented (up-down) 2-pixel-by-1-pixel microlenses 332, one or more 2-pixel-by-2-pixel microlenses 342, or different combinations thereof.

Again, referring to FIG. 3C and FIG. 3D, once the pixel array captures a frame, thus capturing focus pixel data for each focus pixel, focus pixel data from paired focus pixels may be compared with one another. For example, focus pixel data from a left focus pixel photodiode may be compared with focus pixel data from a right focus pixel photodiode, and focus pixel data from a top focus pixel photodiode may be compared with focus pixel data from a bottom focus pixel photodiode. If the compared focus pixel data values differ, this difference is known as the phase disparity, also known as the phase difference, defocus value, or separation error. Focus pixels under a 2-pixel-by-2-pixel microlens 342 as in FIG. 3D essentially have two vertically adjacent horizontally-oriented pairs of focus pixels and/or two horizontally-adjacent vertically-oriented pairs of focus pixels. Thus, the focus pixel data from the UL focus pixel may be compared to focus pixel data from the BL focus pixel (as a top/bottom pair), focus pixel data from the UR focus pixel may be compared to focus pixel data from the BR focus pixel (as a top/bottom pair), focus pixel data from the UL focus pixel may be compared to focus pixel data from the UR focus pixel (as a left/right pair), focus pixel data from the BL focus pixel may be compared to focus pixel data from the BR focus pixel (as a left/right pair), or some combination thereof. In some cases, focus pixel data may alternately or additionally be compared between pixels that are opposite each other diagonally (along two axes). For example, focus pixel data from the UL focus pixel focus may be compared to focus pixel data from the BR focus pixel, and/or focus pixel data from the BL focus pixel focus may be compared to focus pixel data from the UR focus pixel.

While the focus pixels under the 2-pixel-by-1-pixel microlens 332 of FIG. 3C and the focus pixels under the 2-pixel-by-2-pixel microlens 342 of FIG. 3D are all illustrated having the color filter 312 of the first color, this is not required. In some cases, the normal pattern of the CFA of the pixel array may continue under a 2-pixel-by-1-pixel microlens 332 and/or under a 2-pixel-by-2-pixel microlens 342.

Figure 4:
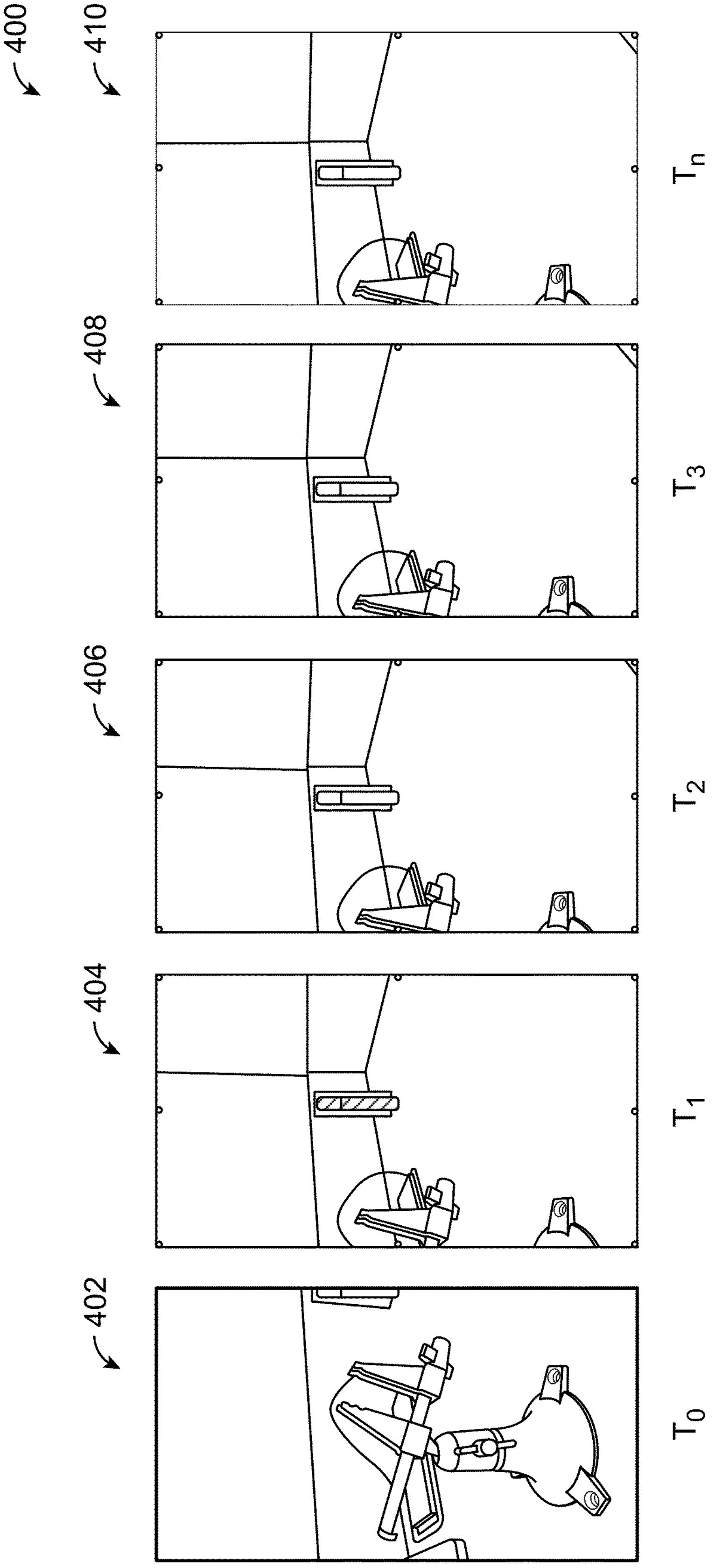
FIG. 4 includes five example images to illustrate an example scenario of capturing successive images.

FIG. 4 includes five example images (image 402, image 404, image 406, image 408, and image 410) to illustrate an example scenario 400 of capturing successive images. For example, image 402 may be captured at a first time "T0." A camera that captured image 402 may have been stationary for a period of time before T0 such that the camera focused at a depth of focus based on an object at a center of image 402 by the time image 402 was captured.

Image 404 may be captured at a second time "T1." T1 may be after T0. The camera that captured image 402 may pan to the right between capturing image 402 and image 404. At T1, the camera may still be focused at the depth of focus determined for image 402. As such, objects at the center of image 404 may be out of focus. Starting at T1, the camera may begin to determine a depth of focus for focusing the camera. Determining the depth of focus and focusing the lens may take time.

For example, image 406, image 408, may be captured while the camera is determining the depth of focus. For example, the camera may be capturing frames at a rate of 60 frames per second (fps). It may take, for example, more than 2/60 of a second to determine the depth of focus and/or to adjust the lens to a corresponding lens position.

Image 410 is an example image captured based on an ROI determined based on a center of image 404. For example, it may take until a time "Tn" to determine the lens position based on the center of image 404 and to set the lens to the lens position.

If the camera had continued to pan, the autofocus determination of lens positions may continue to be 3 frames behind, and images captured while the camera is panning may be blurry.

Figure 5:
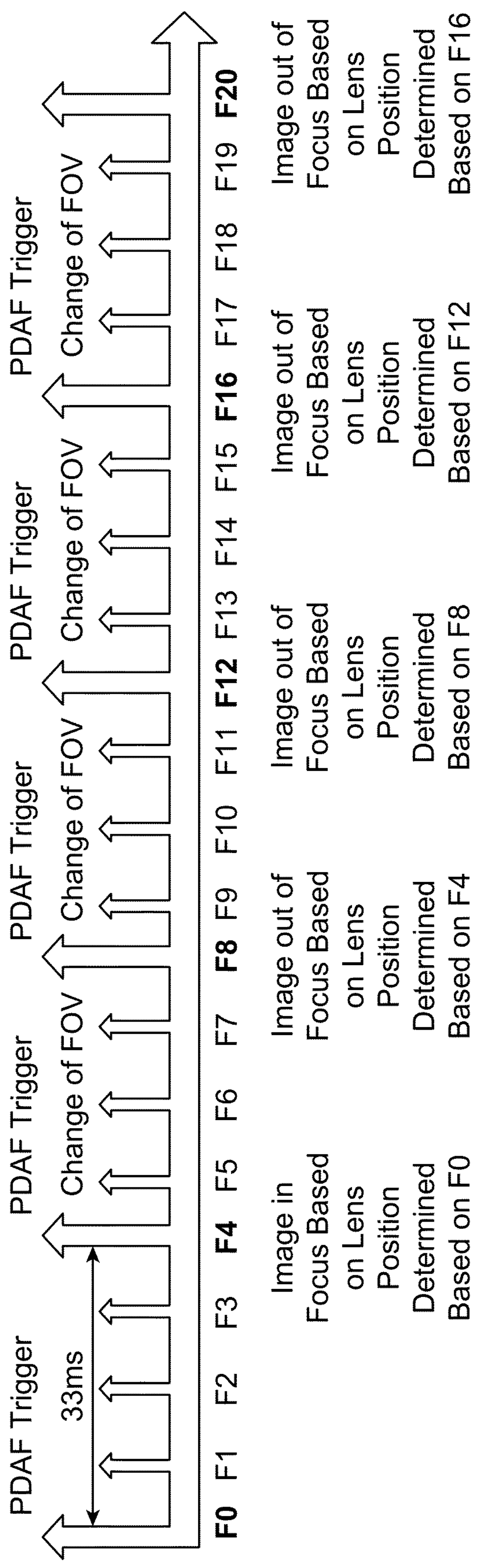
FIG. 5 is a diagram illustrating an example timeline during which image-capture settings may be determined and images may be captured.

FIG. 5 is a diagram illustrating an example timeline 500 during which image-capture settings may be determined and images may be captured. For example, timeline 500 illustrates times associated with capturing frames "F0" through "F20" at a frame-capture rate of 120 fps. At 120 fps, frames may be captured every about 33 milliseconds (ms).

According to the example of FIG. 5, autofocus (AF) may be initiated every 4 frames (e.g., at the times at which "F4," "F8," "F12," "F16," and "F20" are captured). For example, an AF engine may determine and apply a lens position based on a region of interest (ROI) of F0. Subsequently, the AF engine may determine and apply a lens position based on an ROI of F4, F8, F12, F16, and F20 respectively.

Between the capture of F0 and F4, the camera may be stationary. As such, F0 through F4 may be properly focused. For instance, objects in the ROI of F0 through F4 may be in focus. Because the camera has not moved (e.g., panned), the ROI may remain in the same position relative to F0 through F4. Further, objects in the ROI may remain in focus.

At the time F4 is captured, an AF engine may determine a lens position based on F4 and apply the lens position. Additionally, beginning at the time F4 is captured, the camera may begin to pan (e.g., causing a change in a field of view (FOV) of the camera). As the camera pans and captures "F5" through F8, the lens may remain in the position determined based on the ROI of F4. The position of the ROI of F4 may change with relation to the FOV of F5 through F8. For example, by the time F8 is captured, the ROI of F4 may be out of the FOV or at an edge of the FOV. Images in the ROI of F4 may remain in focus. But, unless objects in an ROI of F8 are at the same depth of focus as the images in the ROI of F4, the objects in the ROI of F8 may be out of focus.

As mentioned previously, the AF engine may determine and apply a lens position based on the ROI of F8. However, the camera may continue to pan. It may take the time it takes to capture 4 frames to determine and apply the lens position. For example, the AF engine may apply the lens position determined based on F8 by about the time F12 is captured. As the camera pans and captures "F9" through F12, the lens may remain in the position determined based on the ROI of F8. The position of the ROI of F8 may change with relation to the FOV of F9 through F12. For example, by the time F12 is captured, the ROI of F8 may be out of the FOV or at an edge of the FOV. Images in the ROI of F8 may remain in focus. But, unless objects in an ROI of F12 are at the same depth of focus as the images in the ROI of F8, the objects in the ROI of F12 may be out of focus.

Timeline 500 illustrates that as a camera pans, because AF takes time, AF may be behind, and the camera may be focused on old ROIs. The problem illustrated by timeline 500 applies whether the AF engine determines a lens position every frame or every fourth frame (as illustrated by timeline 500). In either case, because it takes time to determine and apply the lens position, by the time the lens position is applied, the FOV has changed such that objects in the newest ROI will not be in focus unless the depth of focus of the objects in the newest ROI match the depth of focus of an ROI a number of frames prior.

Figure 6:
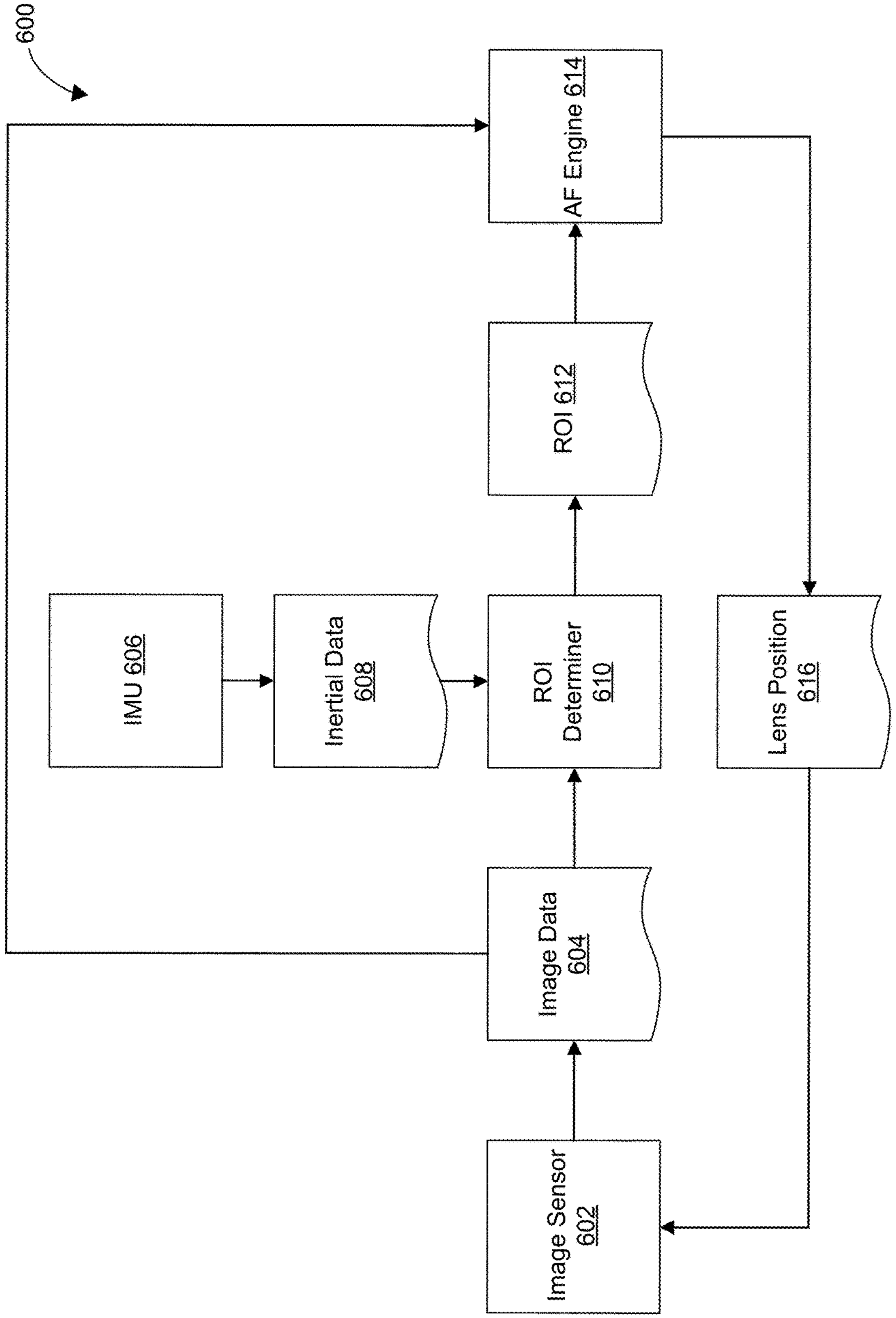
FIG. 6 is a block diagram illustrating an example system for determining a lens position for a camera, according to various aspects of the present disclosure.

FIG. 6 is a block diagram illustrating an example system 600 for determining a lens position for a camera, according to various aspects of the present disclosure. In general, an image sensor 602 may capture image data 604. Additionally, an inertial measurement unit (IMU) 606 may generate inertial data 608. A region of interest (ROI) determiner 610 may predict ROI 612 for an upcoming frame of image data 604 based on inertial data 608. Autofocus (AF) engine 614 may determine a lens position 616 based on ROI 612 and image data 604. Thereafter, image sensor 602 may capture image data 604 based on lens position 616.

Image sensor 602 may be, or may include, a sensor configured to capture light and generate image data 604 based on the captured light. Image sensor 602 may be an example of image sensor 118 of FIG. 1.

Image data 604 may be, or may include, an example frame of image data captured at an example time. Image data 604 may be captured according to image-capture settings including a lens position.

IMU 606 may be, or may include, one or more sensors such as gyroscopes, accelerometers, magnetometers, etc. IMU 606 may generate inertial data 608, which may be, or may include, data indicative of acceleration of IMU 606.

Figure 7:
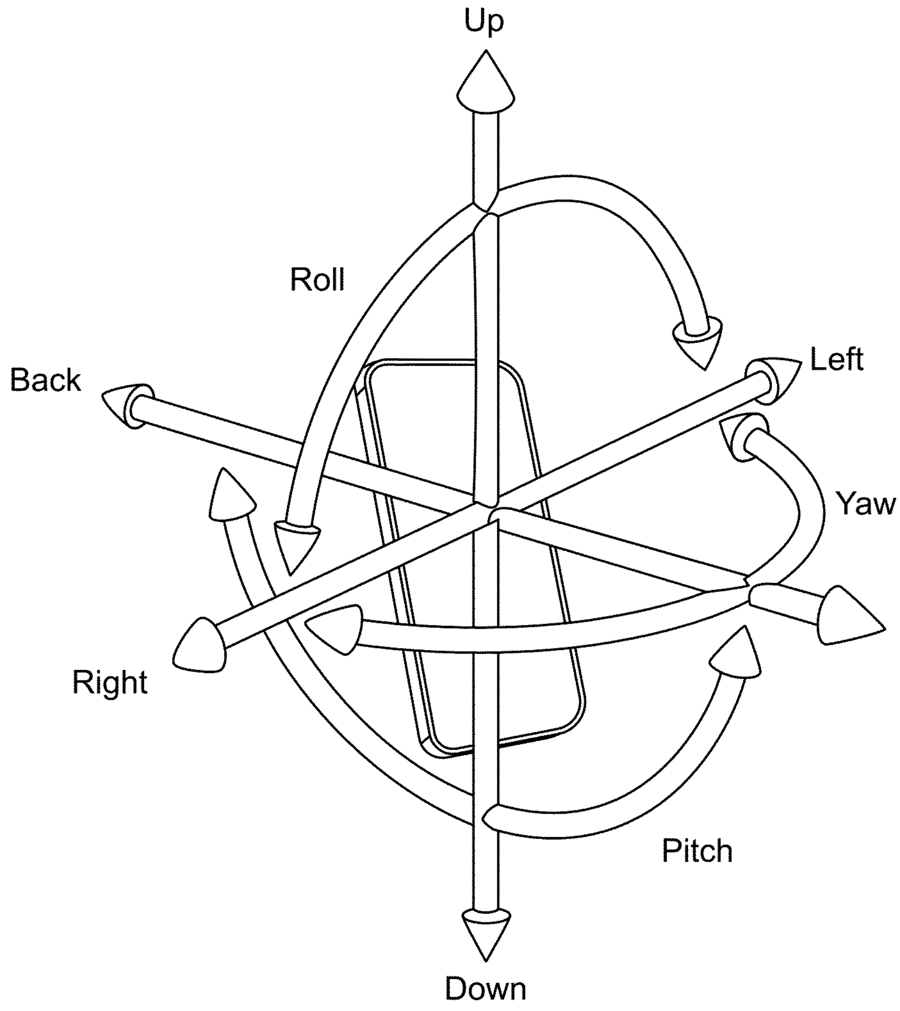
FIG. 7 includes a diagram illustrating a device relative to three translational degrees of freedom and three rotational degrees of freedom.

ROI determiner 610 may determine a pose of image sensor 602 based on inertial data 608. In the present disclosure, the term "pose" may refer to a position and an orientation. For example, a rigid body may move in three translational degrees of freedom (e.g., according to three orthogonal axes, such as an x-axis, a y-axis, and a z-axis). Additionally, the rigid body may reorient in three rotational degrees of freedom (e.g., roll, pitch, and yaw). ROI determiner 610 may track a pose of image sensor 602 over time (e.g., from an initial pose) based on inertial data 608. For example, FIG. 7 includes a diagram illustrating a device relative to three translational degrees of freedom (e.g., along a forward-back axis, a left-right axis, and an up-down axis) and three rotational degrees of freedom (e.g., roll, pitch, and yaw).

Returning to FIG. 6, IMU 606 may be at a first position of a device and image sensor 602 may be at a second position of the device. Inertial data 608 may represent acceleration as measured at the first position of the device. The position of image sensor 602 and IMU 606 relative to each other may be fixed. ROI determiner 610 may have a fixed transformation to transform inertial data 608 into a frame of reference of image sensor 602. Additionally, or alternatively, ROI determiner 610 may have a transformation to transform a pose of IMU 606 to determine a pose of image sensor 602. In any case, ROI determiner 610 may determine a pose of image sensor 602 based on inertial data 608.

Additionally, ROI determiner 610 may predict a pose of image sensor 602 based on inertial data 608. In some aspects, ROI determiner 610 may store a number of instances of inertial data 608 and/or track the pose of image sensor 602 over time based on the number of instances of inertial data 608. Additionally, ROI determiner 610 may include a machine-learning model trained to predict a pose of an image sensor based on inertial data. For example, the machine-learning model may be trained according to a supervised learning process to predict future poses of a device based on inertial data measured by the device.

Figure 8:
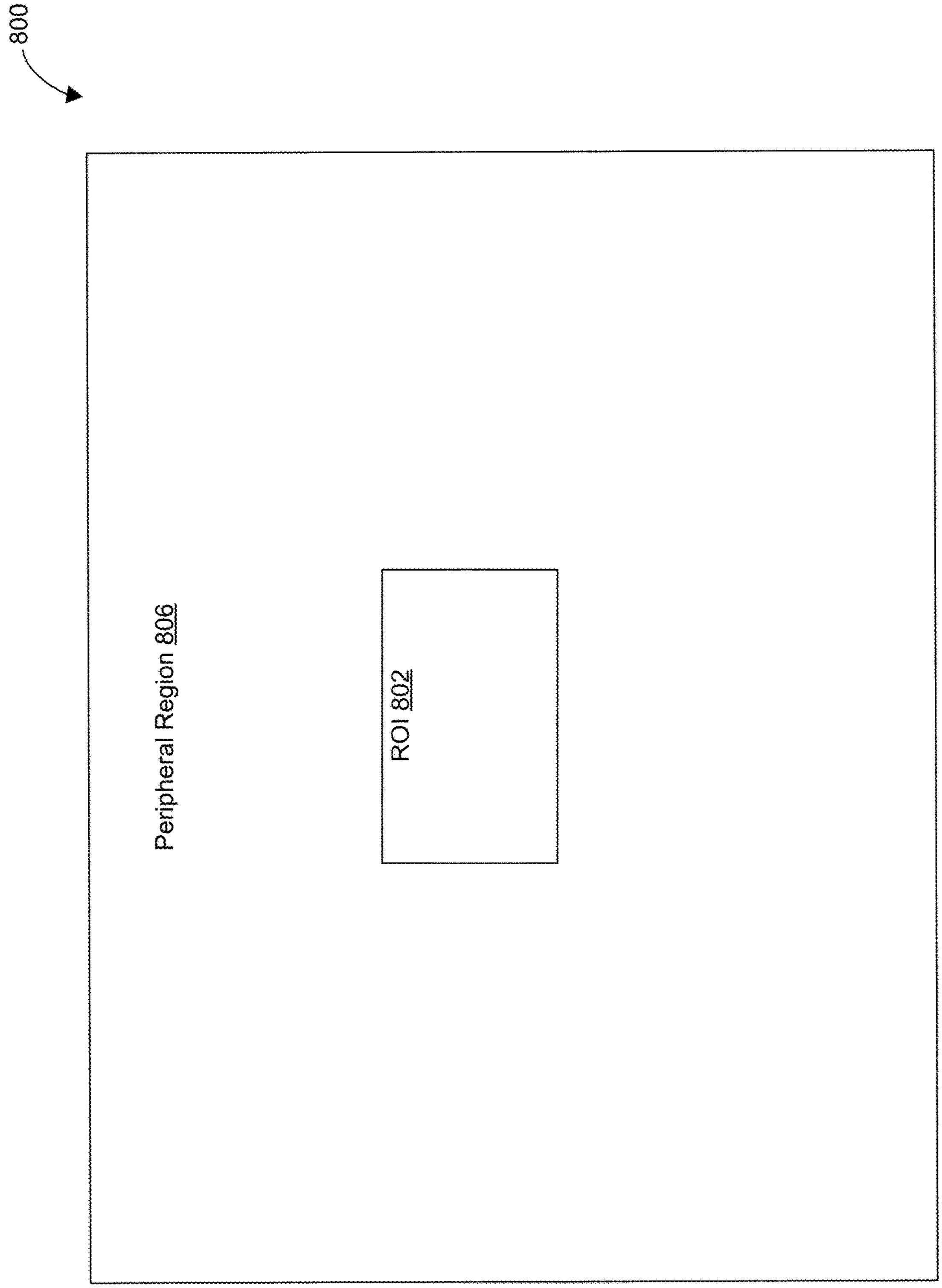
FIG. 8 includes a representation of an example image frame including a ROI.

Further, ROI determiner 610 may predict ROI 612 based on the predicted pose. For example, FIG. 8 includes a representation of an example image frame 800 including a ROI 802. An area outside ROI 802 may be referred to as a peripheral region 806. ROI 802 may be positioned anywhere within image frame 800. ROI 802 may be determined based on, for example, a default position within image frame 800, a gaze of a user, a user input, etc. For example, ROI 802 may be defined to be in a center of image frame 800 by default. As another example, a user may gaze at a portion of image frame 800 and a device may capture an image of the eyes of the user and determine ROI 802 based on the gaze of the user. As another example, image frame 800 may be displayed to user at a display. The user may touch a portion of the display, and the device may determine ROI 802 based on the touched portion of the display.

Returning to FIG. 6, ROI determiner 610 may predict ROI 612 for an upcoming image frame based on inertial data 608. For example, in some aspects, ROI determiner 610 may obtain an indication of an ROI of image data 604. For example, the ROI of image data 604 may be based on a default position within an image frame, a gaze of a user, or a user input. ROI determiner 610 may determine ROI 612 to have the same position within an upcoming image frame as the ROI of image data 604 has with regard to image data 604. For example, if the ROI of image data 604 is in the center of image data 604, ROI determiner 610 may determine ROI 612 to be in a center of an image frame of an upcoming image (e.g., based on the predicted pose of image sensor 602).

Stated another way, ROI determiner 610 may determine a relationship between an ROI of image data 604 and a field of view (FOV) of image data 604. The FOV of image data 604 may correspond to the image frame of image data 604. Further, ROI determiner 610 may determine an FOV of image sensor 602 for the upcoming image frame based on the predicted pose of image sensor 602. ROI determiner 610 may determine ROI 612 such that ROI 612 has the same relationship to the predicted FOV as the ROI of image data 604 has to the FOV of image data 604.

AF engine 614 may determine a lens position based on ROI 612 and image data 604.

For example, image data 604 may include pixels that may be included in ROI 612. AF engine 614 may determine a depth of focus of ROI 612 based on the pixels of ROI 612 included in image data 604. For example, AF engine 614 may use PDAF based on the pixels of ROI 612 included in image data 604 to determine the lens position.

AF engine 614 may be an example of focus-control mechanism 114 of FIG. 4. AF engine 614 may determine the focus depth according to the process described with regard to FIG. 2A through FIG. 3D.

AF engine 614 may apply, or cause image sensor 602 to apply the lens position. For example, AF engine 614 may adjust a position of a lens of image sensor 602 such that the lens is at the determined lens position.

At a later time, for example, at a time associated with the predicted pose and ROI, image sensor 602 may capture an image frame with the lens at ROI 612. Because ROI 612 is based on a predicted ROI 612, objects in ROI 612 may be in focus in the captured image frame.

Figure 9:
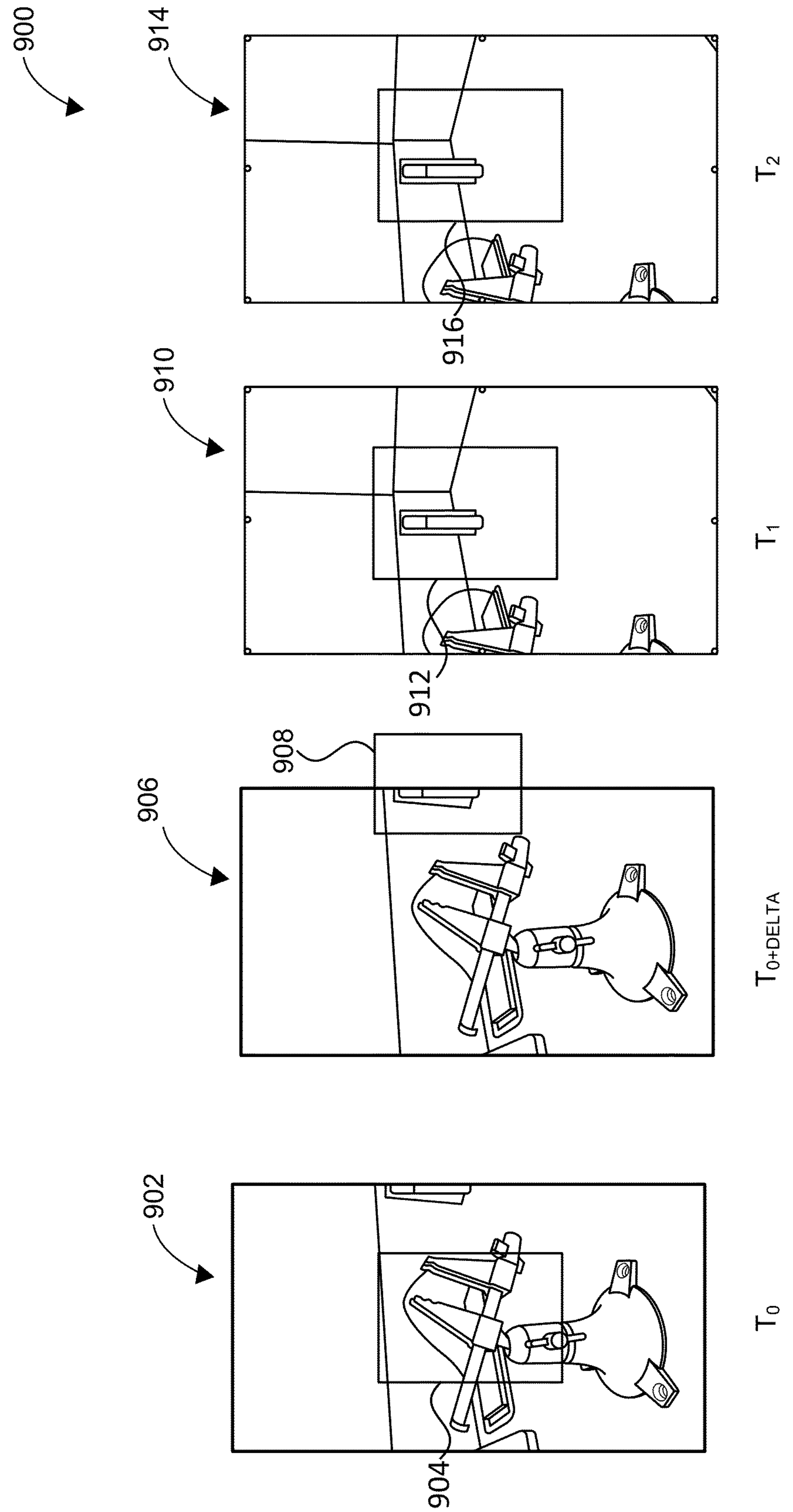
FIG. 9 includes four example images to illustrate an example scenario of capturing successive images, according to various aspects of the present disclosure.

FIG. 9 includes four example images (image 902, image 906, image 910, and image 914) to illustrate an example scenario 900 of capturing successive images, according to various aspects of the present disclosure. Image 902, image 910, and image 914 may be examples of images captured by system 600 of FIG. 6 according to the example operations described with regard to FIG. 6. For example, image sensor 602 may capture image 902 at a first time "T0," image 910 at a second time "T1," and image 914 at a third time "T2."

At T0, a lens of image sensor 602 may be focused based on a depth of focus based on images in ROI 904 of image 902. As such, objects in ROI 904 may be in focus.

At a time $T_{0+\Delta}$, the camera may begin to move. An IMU of the camera (e.g., IMU 606) may detect acceleration of the camera. The IMU may capture inertial data at a rate that is faster than the rate at which the image sensor of the camera captures image frames. For example, image sensor 602 of FIG. 6 may capture image frames (e.g., image data 604) at a rate of 120 fps. IMU 606 may generate inertial data 608 at a rate that is faster than the rate at which image sensor 602 captures images frames, for example, 400 fps, 800 fps, 1000 fps, etc. The metric fps is used to refer to inertial data for simplicity. In any case, IMU 606 may determine inertial data 608 between when image sensor 602 captures image 902 and when image sensor 602 captures image 910. As such, image 906 may not be captured by image sensor 602. Rather, image 906 is included to illustrate operations of system 600.

In particular, ROI determiner 610 may determine ROI 908 based on the inertial data 608 detected at $T_{0+\Delta}$. For example, ROI 908 may be an example of ROI 612. For example, ROI determiner 610 may predict a pose of image sensor 602 based on the inertial data 608 detected at $T_{0+\Delta}$. Further, ROI determiner 610 may determine ROI 908 based on the predicted pose.

AF engine 614 may determine lens position 616 based on ROI 908 and image 902. For example, AF engine 614 may determine lens position 616 using pixels of ROI 908 as phase-detection pixels.

AF engine 614 may adjust (or cause image sensor 602 to adjust) the position of the lens of image sensor 602 such that objects in ROI 908 are in focus by T1. For example, image sensor 602 may determine ROI 908, and determine and apply the lens position to cause objects in ROI 908 to be in focus between $T_{0+\Delta}$ and T1 such that by T1, when image sensor 602 captures image 910, objects in ROI 912 are in focus.

Image sensor 602 may be stationary (e.g., not move and not reorient) between T1 and T2. Based on image sensor 602 not moving or reorienting, ROI determiner 610 may predict ROI 916 to be the same as ROI 912. Further, AF engine 614 may determine a lens position based on objects in ROI 916, which may be the same lens position determined based on objects in ROI 912. Accordingly, objects in ROI 916 may be in focus in image 914.

Figure 10:
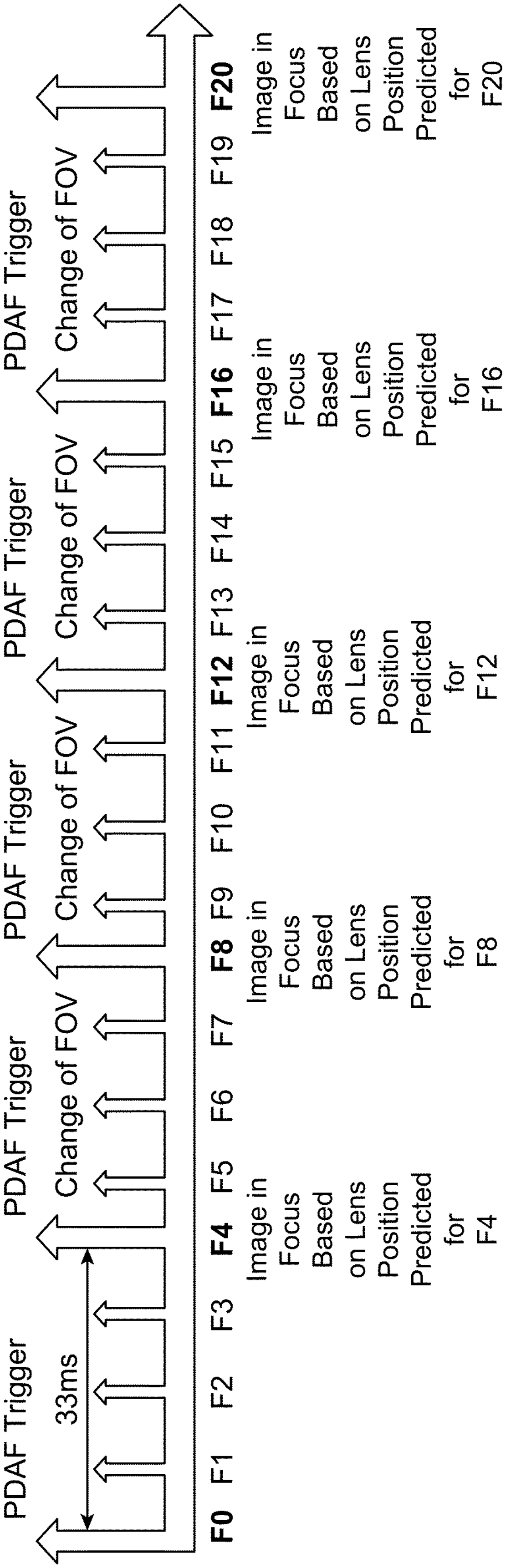
FIG. 10 is a diagram illustrating an example timeline during which image-capture settings may be determined and images may be captured, according to various aspects of the present disclosure.

FIG. 10 is a diagram illustrating an example timeline 1000 during which image-capture settings may be determined and images may be captured, according to various aspects of the present disclosure. For example, timeline 1000 illustrates times associated with capturing frames "F0" through "F20" at a frame-capture rate of 120 fps. System 600 of FIG. 6 may cause image sensor 602 to capture images frames F0 through F20.

According to the example of FIG. 10, AF may be initiated every 4 frames (e.g., at the times at which "F4," "F8," "F12," "F16," and "F20" are captured). For example, an ROI predicter (e.g., ROI determiner 610 of FIG. 6) may predict an ROI for an upcoming frame and an AF engine (e.g., AF engine 614 of FIG. 6) may determine and apply a lens position based on the predicted ROI. For example, shortly after F0 is captured, ROI determiner 610 may predict a pose of the camera that captured F0 for F4. Further, ROI determiner 610 may predict an ROI for F4. AF engine 614 may determine and apply a lens position for F4. Similarly, shortly after F4 is captured, ROI determiner 610 may predict a pose of the camera for F8. Further, ROI determiner 610 may predict an ROI for F8. AF engine 614 may determine and apply a lens position for F8.

Timeline 1000 illustrates that as a camera pans, lens position prediction may keep a lens focused on an ROI of each frame. The operations described with regard to timeline 1000 applies whether AF engine 614 predicts a lens position every frame or every fourth frame (as illustrated by timeline 1000). In either case, AF engine 614 may determine the lens position based on a predicted ROI (which may be referred to as predicting a lens position). Because AF engine 614 determines the lens position based on a predicted ROI, so long as the predicted ROI is within the FOV of the frame for which the ROI was predicted, objects in the ROI will be in focus. In cases in which the ROI is accurately predicted, the ROI of each frame may be in focus.

Figure 11:
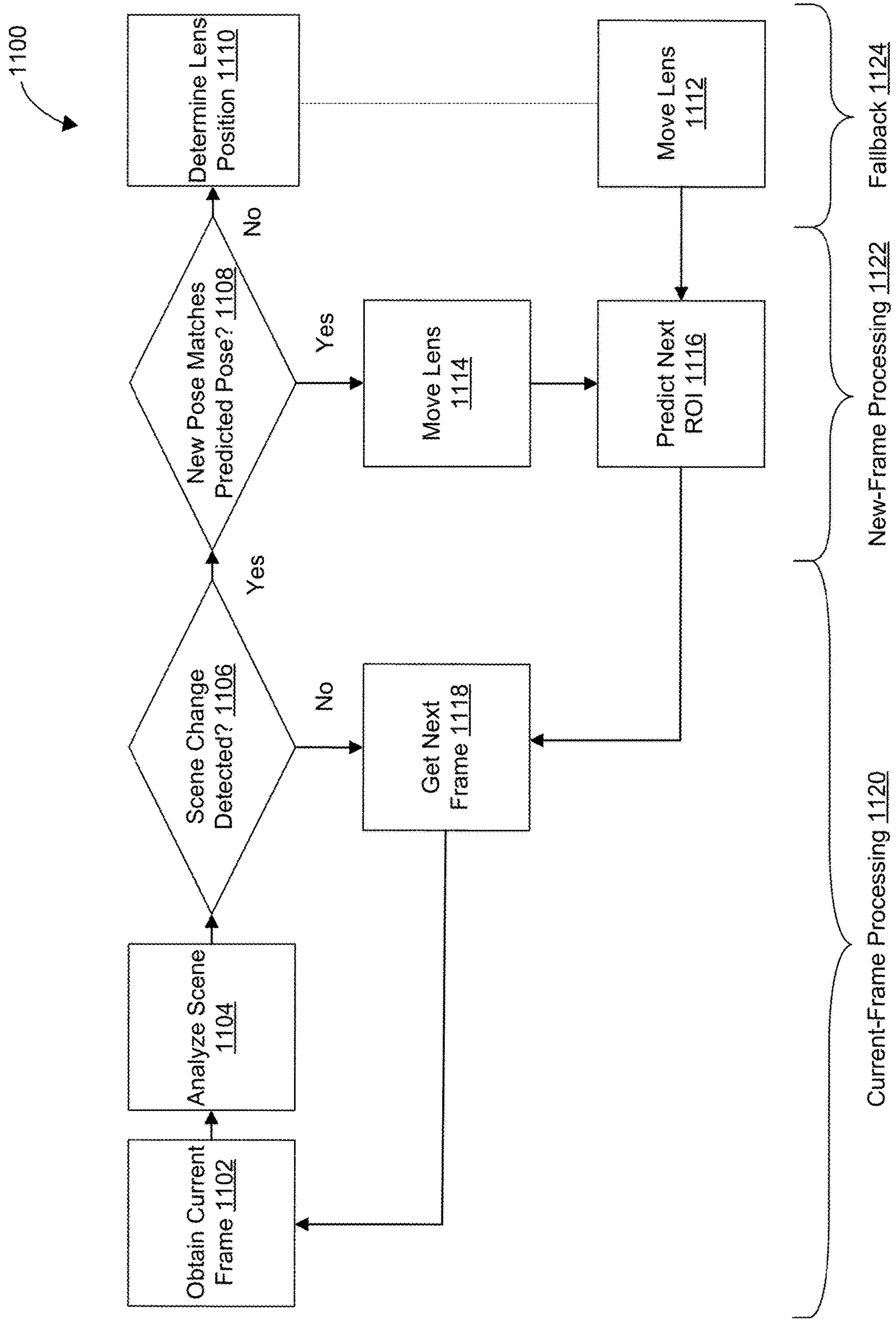
FIG. 11 is a flowchart illustrating an example process for determining and applying image-capture settings, according to various aspects of the present disclosure.

FIG. 11 is a flowchart illustrating an example process 1100 for determining and applying image-capture settings, according to various aspects of the present disclosure. System 600 of FIG. 6 may perform process 1100.

At block 1102, an image sensor may capture a current frame. For example, image sensor 602 may capture image data 604.

At block 1104, a scene depicted in the current frame may be analyzed. For example, a scene analyzer may determine whether the scene has changed. The scene may change if a camera that captured the image frame at block 1102 has moved and/or reoriented. For example, while the scene in the real world may remain the same, the camera's FOV of the scene may change. Such a change in the camera's FOV may constitute the change of scene detected at block 1104. At block 1104, the scene change may be determined based on inertial data (e.g., inertial data 608). In some aspects, at block 1104, a change may be determined based on whether movement indicated by the inertial data exceeds a threshold. For example, if the FOV of a device changes beyond a threshold (e.g., one degree of orientation change).

At decision block 1106, if the scene has not changed (as determined at block 1104), process 1100 may proceed to block 1102. However if the scene has changed, process 1100 may proceed to decision block 1108.

If the scene did not change, and process 1100 proceeds to block 1118, a next frame may be obtained at block 1118. The next frame becomes the current frame and process 1100 proceeds to block 1102.

Block 1102, block 1104, decision block 1106, and block 1118 may be referred to as a current-frame processing 1120 portion of process 1100. In current-frame processing 1120, as long as a camera's FOV of a scene remains the same, no new lens position is calculated or applied. For example, ROI determiner 610 may predict a pose of the camera based on a number (e.g., ten) of instances of inertial data 608. Additionally, ROI determiner 610 may predict ROI 612 for the next frame based on the predicted pose. Using PDAF information in the predicted ROI, AF engine 614 may determine an AF Lens position for the predicted ROI in the next frame.

Alternatively, if the scene did change, and process 1100 proceeds to decision block 1108, at decision block 1108, it will be determined if the new pose of the camera matches the predicted pose of the camera (e.g., within a threshold). For example, ROI determiner 610 may predict poses (e.g., continually). In some aspects, ROI determiner 610 may predict poses whether image sensor 602 is moving (or reorienting) or not. For example, if image sensor 602 is stationary, ROI determiner 610 may predict poses for upcoming frames based on inertial data 608 (which may indicate no movement). If image sensor 602 begins to move, ROI determiner 610 may predict poses based on inertial data 608 (which may indicate movement). If image sensor 602 has been moving for a time, ROI determiner 610 may predict poses based on inertial data 608 (which may indicate continued movement). In any case, ROI determiner 610 may predict an upcoming pose based on current inertial data 608. At decision block 1108, it may be determined whether the predicted pose (e.g., predicted based on previously received inertial data) matches (e.g., within a threshold) a current pose of the image sensor. If the predicted pose matches (e.g., if the prediction was accurate), process 1100 may proceed to block 1114. If the predicted pose does not match (e.g., if the prediction was inaccurate), process 1100 may proceed to block 1110.

At block 1114, the lens may be moved according to the determined lens position. For example, AF engine 614 may cause a lens of image sensor 602 to move to lens position 616.

At block 1116 a next ROI may be determined based on inertial data. For example, ROI determiner 610 may determine ROI 612 based on recently received inertial data. Process 1100 may proceed from block 1116 to block 1118 at which a next frame may be captured based on a lens position determined based on the ROI predicted at block 1116.

Decision block 1108, block 1114, and block 1116 may be referred to as a new-frame processing 1122 portion of process 1100.

For example, in new-frame processing 1122, a scene-change-detection algorithm (e.g., of block 1104) may an AF algorithm to compute AF Lens position. At decision block 1108, a current gyro position of the current frame may be compared to the predicted gyro position from the previous frame. If the actual and predicted gyro positions match (e.g., within a threshold), the lens may be adjusted according to the predicted AF Lens position for new frames. The image may be focused in the current frame if the lens movement is lesser than exposure time.

If the predicted pose does not match the current pose, for example as determined at decision block 1108, process 1100 may proceed to block 1110. At block 1110, a lens position may be determined based on the current pose of the image sensor.

At block 1112, the lens may be moved to the lens position determined at block 1110. Following block 1112, process 1100 may proceed to block 1116 in which a new ROI and lens position may be determined.

Block 1110 and block 1112 may make up a fallback 1124 portion of process 1100. For example, if the predicted pose is different from the measured current pose (e.g., as determined at decision block 1108), process 1100 may fallback to determining a lens position based on the current pose.

Figure 12:
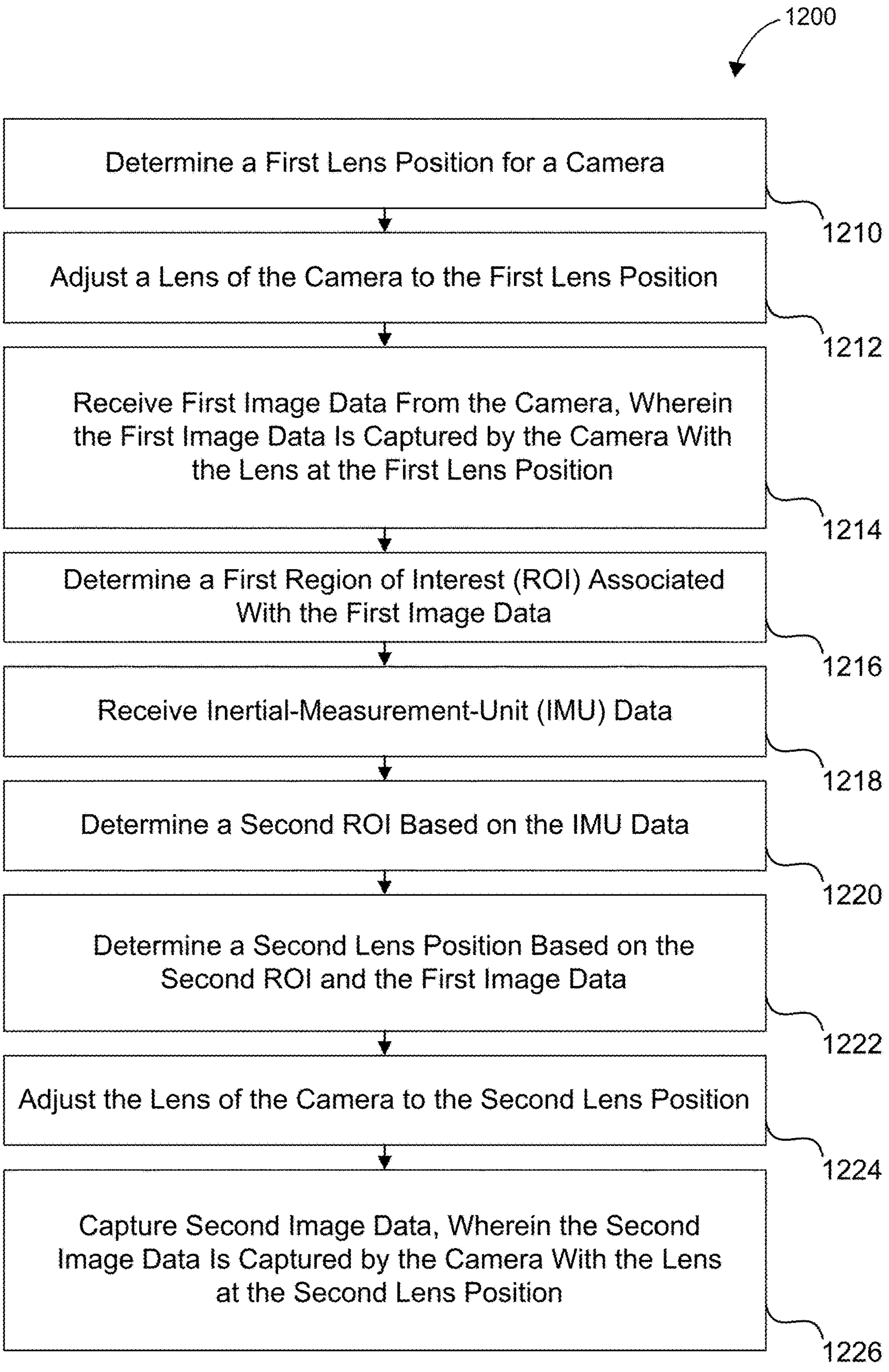
FIG. 12 is a flow diagram illustrating an example process for determining and applying image-capture settings, in accordance with aspects of the present disclosure.

FIG. 12 is a flow diagram illustrating an example process 1200 for determining image-capture settings, in accordance with aspects of the present disclosure. One or more operations of process 1200 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 1200. The one or more operations of process 1200 may be implemented as software components that are executed and run on one or more processors.

At block 1210, a computing device (or one or more components thereof) may determine a first lens position for a camera. For example, AF engine 614 of may determine a first instance of lens position 616.

At block 1212, the computing device (or one or more components thereof) may adjust a lens of the camera to the first lens position. For example, image sensor 602 may adjust a lens of image sensor 602 based on the first instance of lens position 616.

At block 1214, the computing device (or one or more components thereof) may receive first image data from the camera, wherein the first image data is captured by the camera with the lens at the first lens position. For example, image sensor 602 may capture a first instance of image data 604 with a lens of image sensor 602 at the position indicated by the first instance of lens position 616.

At block 1216, the computing device (or one or more components thereof) may determine a first region of interest (ROI) associated with the first image data. For example, ROI determiner 610 may determine a first ROI based on the first instance of image data 604.

In some aspects, the computing device (or one or more components thereof) may determine the first ROI based on at least one of: a default ROI position, a gaze of a user, or a user input. For example, ROI determiner 610 may determine the first ROI based on a default ROI position (e.g., in a center of a frame of an image), a gaze of a user (e.g., based on images of the user's eyes), or a user input (e.g., based on the user selecting a portion of an image).

At block 1218, the computing device (or one or more components thereof) may receive inertial-measurement-unit (IMU) data. Additionally, ROI determiner 610 may receive a inertial data 608 from IMU 606.

At block 1220, the computing device (or one or more components thereof) may determine a second ROI based on the IMU data. For example, ROI determiner 610 may determine a second ROI based on inertial data 608.

In some aspects, the second ROI is determined further based on the first ROI. For example, at block 1220, ROI determiner 610 may determine the second ROI based on inertial data 608 and the first ROI (determined at block 1216).

In some aspects, a position of the second ROI within a field of view (FOV) of the camera may correspond to a position of the first ROI within the FOV of the camera. For example, the position of ROI 912 in image 910 may be based on the position of ROI 904 within image 902.

In some aspects, the computing device (or one or more components thereof) may predict a pose of the camera based on the IMU data, wherein the second ROI is determined based on the predicted pose of the camera. For example, ROI determiner 610 may predict a pose of image sensor 602 based on inertial data 608. Further, ROI determiner 610 may determine the second ROI based on the predicted pose of image sensor 602.

In some aspects, the computing device (or one or more components thereof) may determine an actual pose of the camera; compare the predicted pose to the actual pose; and determine whether to adjust the lens to the second lens position based on the comparison. For example, ROI determiner 610 may receive a second instance of inertial data 608 and determine a second pose of image sensor 602. ROI determiner 610 may compare the second pose to the predicted pose. If the predicted pose is within a threshold distance of the second pose, ROI determiner 610 may determine to adjust the lens position based on the predicted pose. For example, system 600 may implement process 1100.

At block 1222, the computing device (or one or more components thereof) may determine a second lens position based on the second ROI and the first image data. For example, AF engine 614 may determine a second instance of lens position 616 based on the second ROI (e.g., as received by AF engine 614 from ROI determiner 610).

In some aspects, the second lens position may be determined based on focal-distance values based on pixels of the second ROI within the first image data. For example, AF engine 614 may determine the second instance of lens position 616 based on focal-distance values based on pixels of the second ROI in the first instance of image data 604.

In some aspects, the second lens position may be determined according to a phase-detection autofocus (PDAF) technique applied to the focal-distance values. For example, AF engine 614 may apply PDAF to pixels of the ROI of the first instance of image data 604.

At block 1224, the computing device (or one or more components thereof) may adjust the lens of the camera to the second lens position. For example, image sensor 602 may adjust a lens based on the second instance of lens position 616.

At block 1226, the computing device (or one or more components thereof) may capture second image data, wherein the second image data is captured by the camera with the lens at the second lens position. For example, image sensor 602 may capture a second instance of image data 604 with a lens of image sensor 602 at the position indicated by the second instance of lens position 616.

In some aspects, the computing device (or one or more components thereof) may at least one of: store the image data, display the image data, transmit the image data, or process the image data. For example, system 600 may store, display, transmit, and/or process the second image data captured at block 1226.

In some examples, as noted previously, the methods described herein (e.g., process 1100 of FIG. 11, process 1200 of FIG. 12, and/or other methods described herein) can be performed, in whole or in part, by a computing device or apparatus. In one example, one or more of the methods can be performed by image-processing system 100 of FIG. 1, system 600 of FIG. 6, or by another system or device. In another example, one or more of the methods (e.g., process 1100, process 1200, and/or other methods described herein) can be performed, in whole or in part, by the computing-device architecture 1500 shown in FIG. 15. For instance, a computing device with the computing-device architecture 1500 shown in FIG. 15 can include, or be included in, the components of control mechanism 110 and/or image-processing device 104 of image-processing system 100 of FIG. 1 and/or system 600 of FIG. 6 and can implement the operations of process 1100, process 1200, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1100, process 1200, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1100, process 1200, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 13:
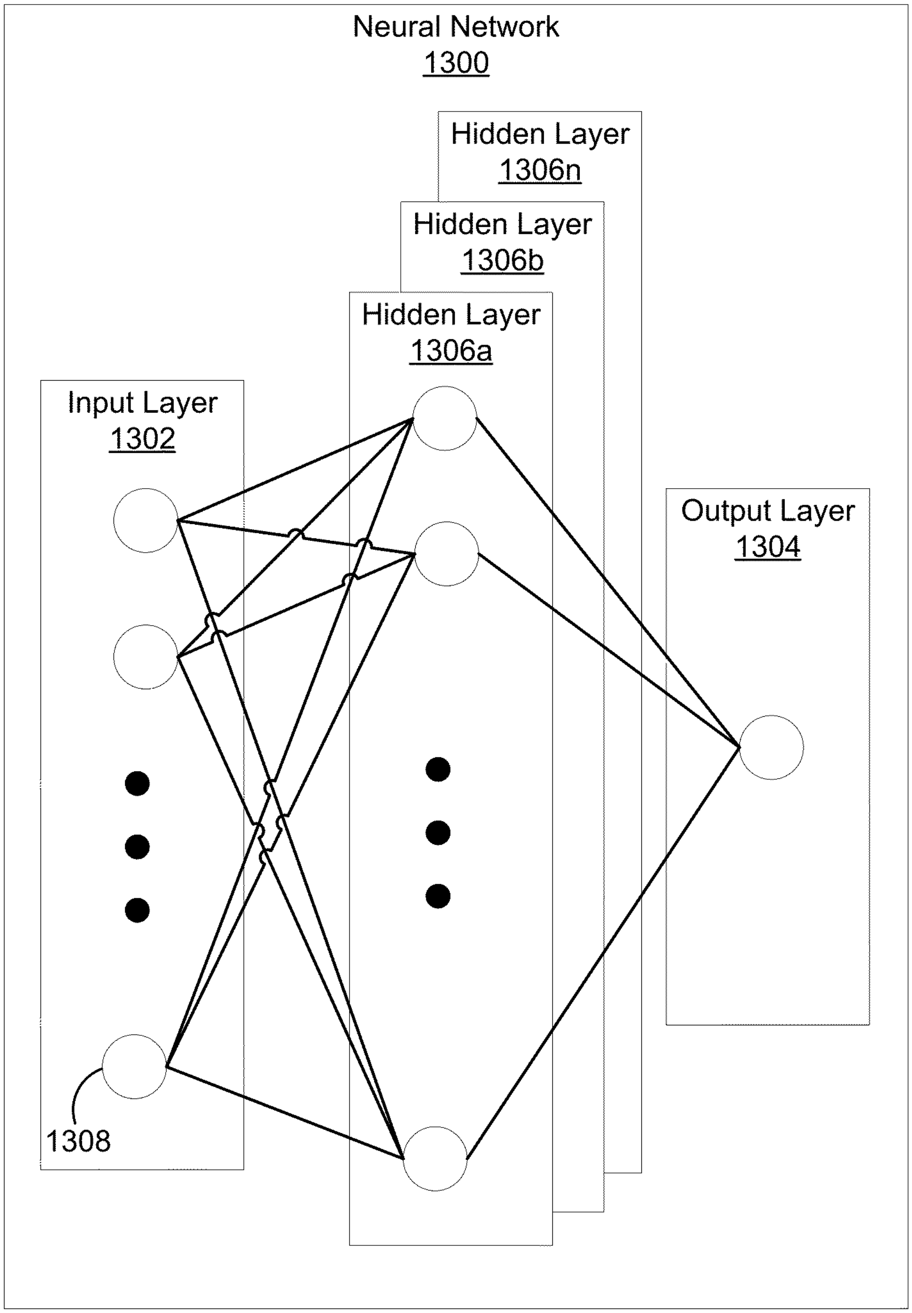
FIG. 13 is a block diagram illustrating an example of a deep learning neural network that can be used to perform various tasks, according to some aspects of the disclosed technology.

FIG. 13 is an illustrative example of a neural network 1300 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1300 may be an example of, or can implement, ROI determiner 610 of FIG. 6, a pose-prediction algorithm of ROI determiner 610, an ROI-determination algorithm of ROI determiner 610, AF engine 614 of FIG. 6, and/or a lens-position determination of AF engine 614.

An input layer 1302 includes input data. In one illustrative example, input layer 1302 can include data representing inertial data 608. Neural network 1300 includes multiple hidden layers, for example, hidden layers 1306*a*, 1306*b*, through 1306*n*. The hidden layers 1306*a*, 1306*b*, through hidden layer 1306*n* include "n" number of hidden layers, where "n" is an integer greater than or equal to one. The number of hidden layers can be made to include as many layers as needed for the given application. Neural network 1300 further includes an output layer 1304 that provides an output resulting from the processing performed by the hidden layers 1306*a*, 1306*b*, through 1306*n*. In one illustrative example, output layer 1304 can provide ROI 612.

Neural network 1300 may be, or may include, a multi-layer neural network of interconnected nodes. Each node can represent a piece of information. Information associated with the nodes is shared among the different layers and each layer retains information as information is processed. In some cases, neural network 1300 can include a feed-forward network, in which case there are no feedback connections where outputs of the network are fed back into itself. In some cases, neural network 1300 can include a recurrent neural network, which can have loops that allow information to be carried across nodes while reading in input.

Information can be exchanged between nodes through node-to-node interconnections between the various layers. Nodes of input layer 1302 can activate a set of nodes in the first hidden layer 1306*a*. For example, as shown, each of the input nodes of input layer 1302 is connected to each of the nodes of the first hidden layer 1306*a*. The nodes of first hidden layer 1306*a* can transform the information of each input node by applying activation functions to the input node information. The information derived from the transformation can then be passed to and can activate the nodes of the next hidden layer 1306*b*, which can perform their own designated functions. Example functions include convolutional, up-sampling, data transformation, and/or any other suitable functions. The output of the hidden layer 1306*b* can then activate nodes of the next hidden layer, and so on. The output of the last hidden layer 1306*n* can activate one or more nodes of the output layer 1304, at which an output is provided. In some cases, while nodes (e.g., node 1308) in neural network 1300 are shown as having multiple output lines, a node has a single output and all lines shown as being output from a node represent the same output value.

In some cases, each node or interconnection between nodes can have a weight that is a set of parameters derived from the training of neural network 1300. Once neural network 1300 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1300 to be adaptive to inputs and able to learn as more and more data is processed.

Neural network 1300 may be pre-trained to process the features from the data in the input layer 1302 using the different hidden layers 1306*a*, 1306*b*, through 1306*n* in order to provide the output through the output layer 1304. In an example in which neural network 1300 is used to identify features in images, neural network 1300 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1300 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1300 is trained well enough so that the weights of the layers are accurately tuned.

For the example of identifying objects in images, the forward pass can include passing a training image through neural network 1300. The weights are initially randomized before neural network 1300 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1300, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1300 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum 1/2(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1300 can perform a backward pass by determining which inputs (weights) most contributed to the loss of the network and can adjust the weights so that the loss decreases and is eventually minimized. A derivative of the loss with respect to the weights (denoted as dL/DW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=wi-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 1300 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1300 can include any other deep network other than a CNN, such as an autoencoder, a deep belief nets (DBNs), a Recurrent Neural Networks (RNNs), among others.

Figure 14:
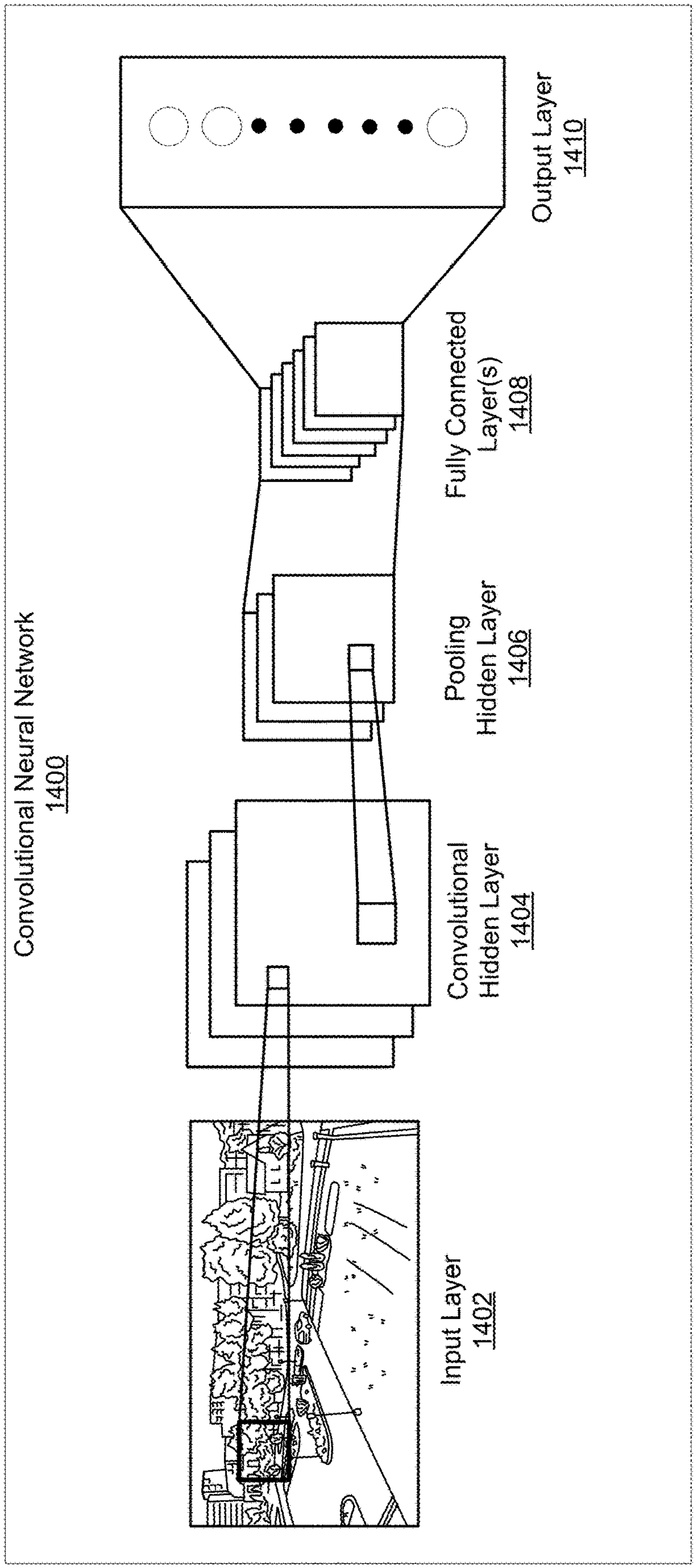
FIG. 14 is a block diagram illustrating an example of a convolutional neural network (CNN), according to various aspects of the present disclosure.

FIG. 14 is an illustrative example of a convolutional neural network (CNN) 1400. The input layer 1402 of the CNN 1400 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1404, an optional non-linear activation layer, a pooling hidden layer 1406, and fully connected layer 1408 (which fully connected layer 1408 can be hidden) to get an output at the output layer 1410. While only one of each hidden layer is shown in FIG. 14, one of ordinary skill will appreciate that multiple convolutional hidden layers, non-linear layers, pooling hidden layers, and/or fully connected layers can be included in the CNN 1400. As previously described, the output can indicate a single class of an object or can include a probability of classes that best describe the object in the image.

The first layer of the CNN 1400 can be the convolutional hidden layer 1404. The convolutional hidden layer 1404 can analyze image data of the input layer 1402. Each node of the convolutional hidden layer 1404 is connected to a region of nodes (pixels) of the input image called a receptive field. The convolutional hidden layer 1404 can be considered as one or more filters (each filter corresponding to a different activation or feature map), with each convolutional iteration of a filter being a node or neuron of the convolutional hidden layer 1404. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1404. Each connection between a node and a receptive field for that node learns a weight and, in some cases, an overall bias such that each node learns to analyze its particular local receptive field in the input image. Each node of the convolutional hidden layer 1404 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1404 is due to each node of the convolutional layer being applied to its corresponding receptive field. For example, a filter of the convolutional hidden layer 1404 can begin in the top-left corner of the input image array and can convolve around the input image. As noted above, each convolutional iteration of the filter can be considered a node or neuron of the convolutional hidden layer 1404. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1404. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1404.

The mapping from the input layer to the convolutional hidden layer 1404 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1404 can include several activation maps in order to identify multiple features in an image. The example shown in FIG. 14 includes three activation maps. Using three activation maps, the convolutional hidden layer 1404 can detect three different kinds of features, with each feature being detectable across the entire image.

In some examples, a non-linear hidden layer can be applied after the convolutional hidden layer 1404. The non-linear layer can be used to introduce non-linearity to a system that has been computing linear operations. One illustrative example of a non-linear layer is a rectified linear unit (ReLU) layer. A ReLU layer can apply the function f(x)=max(0,x) to all of the values in the input volume, which changes all the negative activations to 0. The ReLU can thus increase the non-linear properties of the CNN 1400 without affecting the receptive fields of the convolutional hidden layer 1404.

The pooling hidden layer 1406 can be applied after the convolutional hidden layer 1404 (and after the non-linear hidden layer when used). The pooling hidden layer 1406 is used to simplify the information in the output from the convolutional hidden layer 1404. For example, the pooling hidden layer 1406 can take each activation map output from the convolutional hidden layer 1404 and generates a condensed activation map (or feature map) using a pooling function. Max-pooling is one example of a function performed by a pooling hidden layer. Other forms of pooling functions be used by the pooling hidden layer 1406, such as average pooling, L2-norm pooling, or other suitable pooling functions. A pooling function (e.g., a max-pooling filter, an L2-norm filter, or other suitable pooling filter) is applied to each activation map included in the convolutional hidden layer 1404. In the example shown in FIG. 14, three pooling filters are used for the three activation maps in the convolutional hidden layer 1404.

In some examples, max-pooling can be used by applying a max-pooling filter (e.g., having a size of 2×2) with a stride (e.g., equal to a dimension of the filter, such as a stride of 2) to an activation map output from the convolutional hidden layer 1404. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1404 having a dimension of 24×24 nodes, the output from the pooling hidden layer 1406 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1400.

The final layer of connections in the network is a fully-connected layer that connects every node from the pooling hidden layer 1406 to every one of the output nodes in the output layer 1410. Using the example above, the input layer includes 28×28 nodes encoding the pixel intensities of the input image, the convolutional hidden layer 1404 includes 3×24×24 hidden feature nodes based on application of a 5×5 local receptive field (for the filters) to three activation maps, and the pooling hidden layer 1406 includes a layer of 3×12×12 hidden feature nodes based on application of max-pooling filter to 2×2 regions across each of the three feature maps. Extending this example, the output layer 1410 can include ten output nodes. In such an example, every node of the 3×12×12 pooling hidden layer 1406 is connected to every node of the output layer 1410.

The fully connected layer 1408 can obtain the output of the previous pooling hidden layer 1406 (which should represent the activation maps of high-level features) and determines the features that most correlate to a particular class. For example, the fully connected layer 1408 can determine the high-level features that most strongly correlate to a particular class and can include weights (nodes) for the high-level features. A product can be computed between the weights of the fully connected layer 1408 and the pooling hidden layer 1406 to obtain probabilities for the different classes. For example, if the CNN 1400 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1410 can include an M-dimensional vector (in the prior example, M=10). M indicates the number of classes that the CNN 1400 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 15 illustrates an example computing-device architecture 1500 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1500 may include, implement, or be included in any or all of devices, modules, or systems described herein. Additionally or alternatively, computing-device architecture 1500 may be configured to perform process 1200, and/or other process described herein.

The components of computing-device architecture 1500 are shown in electrical communication with each other using connection 1512, such as a bus. The example computing-device architecture 1500 includes a processing unit (CPU or processor) 1502 and computing device connection 1512 that couples various computing device components including computing device memory 1510, such as read only memory (ROM) 1508 and random-access memory (RAM) 1506, to processor 1502.

Computing-device architecture 1500 can include a cache of high-speed memory connected directly with, in close proximity to, or integrated as part of processor 1502. Computing-device architecture 1500 can copy data from memory 1510 and/or the storage device 1514 to cache 1504 for quick access by processor 1502. In this way, the cache can provide a performance boost that avoids processor 1502 delays while waiting for data. These and other modules can control or be configured to control processor 1502 to perform various actions. Other computing device memory 1510 may be available for use as well. Memory 1510 can include multiple different types of memory with different performance characteristics. Processor 1502 can include any general-purpose processor and a hardware or software service, such as service 1 1516, service 2 1518, and service 3 1520 stored in storage device 1514, configured to control processor 1502 as well as a special-purpose processor where software instructions are incorporated into the processor design. Processor 1502 may be a self-contained system, containing multiple cores or processors, a bus, memory controller, cache, etc. A multi-core processor may be symmetric or asymmetric.

To enable user interaction with the computing-device architecture 1500, input device 1522 can represent any number of input mechanisms, such as a microphone for speech, a touch-sensitive screen for gesture or graphical input, keyboard, mouse, motion input, speech and so forth. Output device 1524 can also be one or more of a number of output mechanisms known to those of skill in the art, such as a display, projector, television, speaker device, etc. In some instances, multimodal computing devices can enable a user to provide multiple types of input to communicate with computing-device architecture 1500. Communication interface 1526 can generally govern and manage the user input and computing device output. There is no restriction on operating on any particular hardware arrangement and therefore the basic features here may easily be substituted for improved hardware or firmware arrangements as they are developed.

Storage device 1514 is a non-volatile memory and can be a hard disk or other types of computer readable media which can store data that are accessible by a computer, such as magnetic cassettes, flash memory cards, solid state memory devices, digital versatile discs (DVDs), cartridges, random-access memories (RAMs) 1506, read only memory (ROM) 1508, and hybrids thereof. Storage device 1514 can include services 1516, 1518, and 1520 for controlling processor 1502. Other hardware or software modules are contemplated. Storage device 1514 can be connected to the computing device connection 1512. In one aspect, a hardware module that performs a particular function can include the software component stored in a computer-readable medium in connection with the necessary hardware components, such as processor 1502, connection 1512, output device 1524, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for capturing image data, the apparatus comprising: at least one memory; and; at least one processor coupled to the at least one memory and configured to: determine a first lens position for a camera; adjust a lens of the camera to the first lens position; receive first image data from the camera, wherein the first image data is captured by the camera with the lens at the first lens position; determine a first region of interest (ROI) associated with the first image data; receive inertial-measurement-unit (IMU) data; determine a second ROI based on the IMU data; determine a second lens position based on the second ROI and the first image data; adjust the lens of the camera to the second lens position; and capture second image data, wherein the second image data is captured by the camera with the lens at the second lens position.

Aspect 2. The apparatus of aspect 1, wherein the second ROI is determined further based on the first ROI.

Aspect 3. The apparatus of aspect 2, wherein a position of the second ROI within a field of view (FOV) of the camera corresponds to a position of the first ROI within the FOV of the camera.

Aspect 4. The apparatus of any one of aspects 2 or 3, wherein the at least one processor is configured to determine the first ROI based on at least one of: a default ROI position, a gaze of a user, or a user input.

Aspect 5. The apparatus of any one of aspects 1 to 4, wherein the second lens position is determined based on focal-distance values based on pixels of the second ROI within the first image data.

Aspect 6. The apparatus of aspect 5, wherein the second lens position is determined according to a phase-detection autofocus (PDAF) technique applied to the focal-distance values.

Aspect 7. The apparatus of any one of aspects 1 to 6, wherein the at least one processor is configured to predict a pose of the camera based on the IMU data, wherein the second ROI is determined based on the predicted pose of the camera.

Aspect 8. The apparatus of aspect 7, wherein the at least one processor is configured to: determine an actual pose of the camera; compare the predicted pose to the actual pose; and determine whether to adjust the lens to the second lens position based on the comparison.

Aspect 9. The apparatus of any one of aspects 1 to 8, wherein the at least one processor is configured to at least one of: store the image data, display the image data, transmit the image data, or process the image data.

Aspect 10. A method for capturing image data, the method comprising: determining a first lens position for a camera; adjusting a lens of the camera to the first lens position; receiving first image data from the camera, wherein the first image data is captured by the camera with the lens at the first lens position; determining a first region of interest (ROI) associated with the first image data; receiving inertial-measurement-unit (IMU) data; determining a second ROI based on the IMU data; determining a second lens position based on the second ROI and the first image data; adjusting the lens of the camera to the second lens position; and capturing second image data, wherein the second image data is captured by the camera with the lens at the second lens position.

Aspect 11. The method of aspect 10, wherein the second ROI is determined further based on the first ROI.

Aspect 12. The method of aspect 11, wherein a position of the second ROI within a field of view (FOV) of the camera corresponds to a position of the first ROI within the FOV of the camera.

Aspect 13. The method of any one of aspects 11 or 12, further comprising determining the first ROI based on at least one of: a default ROI position, a gaze of a user, or a user input.

Aspect 14. The method of any one of aspects 10 to 13, wherein the second lens position is determined based on focal-distance values based on pixels of the second ROI within the first image data.

Aspect 15. The method of aspect 14, wherein the second lens position is determined according to a phase-detection autofocus (PDAF) technique applied to the focal-distance values.

Aspect 16. The method of any one of aspects 10 to 15, further comprising predicting a pose of the camera based on the IMU data, wherein the second ROI is determined based on the predicted pose of the camera.

Aspect 17. The method of aspect 16, further comprising: determining an actual pose of the camera; comparing the predicted pose to the actual pose; and determining whether to adjust the lens to the second lens position based on the comparison.

Aspect 18. The method of any one of aspects 10 to 17, further comprising at least one of: storing the image data, displaying the image data, transmitting the image data, or processing the image data.

Aspect 19. A non-transitory computer-readable storage medium having stored thereon instructions that, when executed by at least one processor, cause the at least one processor to: determine a first lens position for a camera; adjust a lens of the camera to the first lens position; receive first image data from the camera, wherein the first image data is captured by the camera with the lens at the first lens position; determine a first region of interest (ROI) associated with the first image data; receive inertial-measurement-unit (IMU) data; determine a second ROI based on the IMU data; determine a second lens position based on the second ROI and the first image data; adjust the lens of the camera to the second lens position; and capture second image data, wherein the second image data is captured by the camera with the lens at the second lens position.

Aspect 20. The non-transitory computer-readable storage medium of aspect 19, wherein the second ROI is determined further based on the first ROI.

Aspect 21. A non-transitory computer-readable storage medium having stored thereon instructions that, when executed by at least one processor, cause the at least one processor to perform operations according to any of aspects 10 to 18.

Aspect 22. An apparatus for providing virtual content for display, the apparatus comprising one or more means for perform operations according to any of aspects 10 to 18.

What is claimed is:

1. An apparatus for capturing image data, the apparatus comprising:

at least one memory; and;

at least one processor coupled to the at least one memory and configured to:

determine a first lens position for a camera;

adjust a lens of the camera to the first lens position;

receive first image data from the camera, wherein the first image data is captured by the camera with the lens at the first lens position;

determine a first region of interest (ROI) associated with the first image data;

receive inertial-measurement-unit (IMU) data;

determine a second ROI based on the IMU data;

determine a second lens position based on the second ROI and the first image data;

adjust the lens of the camera to the second lens position; and capture second image data, wherein the second image data is captured by the camera with the lens at the second lens position.

2. The apparatus of claim 1, wherein the second ROI is determined further based on the first ROI.

3. The apparatus of claim 2, wherein a position of the second ROI within a field of view (FOV) of the camera corresponds to a position of the first ROI within the FOV of the camera.

4. The apparatus of claim 2, wherein the at least one processor is configured to determine the first ROI based on at least one of: a default ROI position, a gaze of a user, or a user input.

5. The apparatus of claim 1, wherein the second lens position is determined based on focal-distance values based on pixels of the second ROI within the first image data.

6. The apparatus of claim 5, wherein the second lens position is determined according to a phase-detection autofocus (PDAF) technique applied to the focal-distance values.

7. The apparatus of claim 1, wherein the at least one processor is configured to predict a pose of the camera based on the IMU data, wherein the second ROI is determined based on the predicted pose of the camera.

8. The apparatus of claim 7, wherein the at least one processor is configured to:

determine an actual pose of the camera;

compare the predicted pose to the actual pose; and determine whether to adjust the lens to the second lens position based on the comparison.

9. The apparatus of claim 1, wherein the at least one processor is configured to at least one of: store the image data, display the image data, transmit the image data, or process the image data.

10. A method for capturing image data, the method comprising:

determining a first lens position for a camera;

adjusting a lens of the camera to the first lens position;

receiving first image data from the camera, wherein the first image data is captured by the camera with the lens at the first lens position;

determining a first region of interest (ROI) associated with the first image data;

receiving inertial-measurement-unit (IMU) data;

determining a second ROI based on the IMU data;

determining a second lens position based on the second ROI and the first image data;

adjusting the lens of the camera to the second lens position; and capturing second image data, wherein the second image data is captured by the camera with the lens at the second lens position.

11. The method of claim 10, wherein the second ROI is determined further based on the first ROI.

12. The method of claim 11, wherein a position of the second ROI within a field of view (FOV) of the camera corresponds to a position of the first ROI within the FOV of the camera.

13. The method of claim 11, further comprising determining the first ROI based on at least one of: a default ROI position, a gaze of a user, or a user input.

14. The method of claim 10, wherein the second lens position is determined based on focal-distance values based on pixels of the second ROI within the first image data.

15. The method of claim 14, wherein the second lens position is determined according to a phase-detection autofocus (PDAF) technique applied to the focal-distance values.

16. The method of claim 10, further comprising predicting a pose of the camera based on the IMU data, wherein the second ROI is determined based on the predicted pose of the camera.

17. The method of claim 16, further comprising:

determining an actual pose of the camera;

comparing the predicted pose to the actual pose; and determining whether to adjust the lens to the second lens position based on the comparison.

18. The method of claim 10, further comprising at least one of: storing the image data, displaying the image data, transmitting the image data, or processing the image data.

19. A non-transitory computer-readable storage medium having stored thereon instructions that, when executed by at least one processor, cause the at least one processor to:

determine a first lens position for a camera;

adjust a lens of the camera to the first lens position;

receive first image data from the camera, wherein the first image data is captured by the camera with the lens at the first lens position;

determine a first region of interest (ROI) associated with the first image data;

receive inertial-measurement-unit (IMU) data;

determine a second ROI based on the IMU data;

determine a second lens position based on the second ROI and the first image data;

adjust the lens of the camera to the second lens position; and capture second image data, wherein the second image data is captured by the camera with the lens at the second lens position.

20. The non-transitory computer-readable storage medium of claim 19, wherein the second ROI is determined further based on the first ROI.

* * * * *